US007500914B2

(12) United States Patent
Rodgers et al.

(10) Patent No.: US 7,500,914 B2

(45) **Date of Patent: *Mar. 10, 2009**

(54) GAMING DEVICE WITH MULTIPLE LEVELS WHICH DETERMINE THE NUMBER OF INDICATORS OF A SYMBOL GENERATOR

(75) Inventors: Paulina Rodgers, Reno, NV (US); Hans Elias, Reno, NV (US); Zeke Brill, Reno, NV (US)

(73) Assignee: IGT, Reno, NV (US)

(*) Notice: Subject to any disclaimer, the term of this patent is extended or adjusted under 35 U.S.C. 154(b) by 747 days.

This patent is subject to a terminal disclaimer.

(21) Appl. No.: 10/951,986

(22) Filed: Sep. 27, 2004

(65) Prior Publication Data

US 2005/0054435 A1 Mar. 10, 2005

Related U.S. Application Data

(63) Continuation-in-part of application No. 10/243,047, filed on Sep. 12, 2002, now Pat. No. 7,273,415, which is a continuation-in-part of application No. 10/195,292, filed on Jul. 15, 2002, now Pat. No. 6,595,854, which is a continuation of application No. 09/656,702, filed on Sep. 7, 2000, now Pat. No. 6,439,995.

(51) Int. Cl.
*A63F 13/00* (2006.01)

(52) U.S. Cl. .............................. 463/20; 463/16; 463/25

(58) Field of Classification Search ................... 463/16, 463/19, 20, 25, 42; 273/138.1
See application file for complete search history.

(56) References Cited

U.S. PATENT DOCUMENTS 2,545,644 A 3/1951 Benton et al.
2,743,108 A 4/1956 Sanders
3,904,207 A 9/1975 Gold
3,975,022 A 8/1976 Figueroa (Continued)

FOREIGN PATENT DOCUMENTS

DE 8710757 11/1987

(Continued)

OTHER PUBLICATIONS

The Canonical List of TRiR Pricing Games, [online] [printed on Oct. 7, 2003]. Retrieved from the Internet at , URL: http:/www.chris-lambert.com/PROCE/Pricing_Games.html>.

(Continued)

*Primary Examiner*—Corbett Coburn
*Assistant Examiner*—William McCulloch
(74) *Attorney, Agent, or Firm*—Bell, Boyd & Lloyd LLP

(57) ABSTRACT

A gaming device including at least one award generator which is operable to indicate and provide a player one or more awards associated with the award generator. In one embodiment, based on one or more selections picked by a player, the gaming device is operable to indicate one or more activator symbols from one or more sets of activator symbols. Each activator symbol set includes at least one and preferably a plurality of activator symbols. The award generator is activated and based on the indicated activator symbol, the activated award generator generates one or more awards which are provided to the player.

62 Claims, 18 Drawing Sheets

U.S. PATENT DOCUMENTS

| | | | | |
|---|---|---|---|---|
| 4,182,515 | A | | 1/1980 | Nemeth |
| 4,410,178 | A | | 10/1983 | Partridge |
| 4,448,419 | A | | 5/1984 | Telnaes |
| 4,560,161 | A | | 12/1985 | Hamano |
| 4,624,459 | A | | 11/1986 | Kaufman |
| 4,695,053 | A | | 9/1987 | Vazquez, Jr. et al. |
| 4,732,386 | A | | 3/1988 | Rayfiel |
| 4,775,155 | A | | 10/1988 | Lees |
| 4,991,848 | A | | 2/1991 | Greenwood et al. |
| 5,046,737 | A | | 9/1991 | Fienberg |
| 5,058,893 | A | | 10/1991 | Dickinson et al. |
| 5,092,598 | A | | 3/1992 | Kamille |
| 5,116,055 | A | | 5/1992 | Tracy |
| 5,152,529 | A | | 10/1992 | Okada |
| 5,205,555 | A | | 4/1993 | Hamano |
| 5,342,047 | A | | 8/1994 | Heidel et al. |
| 5,364,100 | A | | 11/1994 | Ludlow et al. |
| 5,380,007 | A | | 1/1995 | Travis et al. |
| 5,393,057 | A | | 2/1995 | Marnell, II |
| 5,395,111 | A | | 3/1995 | Inoue |
| 5,407,200 | A | | 4/1995 | Zalabah |
| 5,411,271 | A | | 5/1995 | Mirando |
| 5,449,173 | A | | 9/1995 | Thomas et al. |
| 5,456,465 | A | | 10/1995 | Durham |
| 5,536,016 | A | | 7/1996 | Thompson |
| 5,542,669 | A | | 8/1996 | Charron et al. |
| 5,560,603 | A | | 10/1996 | Seelig et al. |
| 5,584,763 | A | | 12/1996 | Kelly et al. |
| 5,584,764 | A | | 12/1996 | Inoue |
| 5,609,524 | A | | 3/1997 | Inoue |
| 5,611,535 | A | | 3/1997 | Tiberio |
| 5,611,730 | A | | 3/1997 | Weiss |
| 5,622,366 | A | | 4/1997 | Inoue |
| 5,639,089 | A | | 6/1997 | Matsumoto et al. |
| 5,641,730 | A | | 6/1997 | Brown |
| 5,645,486 | A | | 7/1997 | Nagao et al. |
| 5,647,798 | A | | 7/1997 | Falciglia |
| 5,664,998 | A | | 9/1997 | Seelig et al. |
| 5,711,525 | A | | 1/1998 | Breeding |
| 5,722,891 | A | | 3/1998 | Inoue |
| 5,743,524 | A | | 4/1998 | Nannicola |
| 5,743,526 | A | | 4/1998 | Inoue |
| 5,752,881 | A | | 5/1998 | Inoue |
| 5,755,619 | A | | 5/1998 | Matsumoto et al. |
| 5,769,716 | A | | 6/1998 | Saffari et al. |
| 5,788,573 | A | | 8/1998 | Baerlocher et al. |
| 5,823,872 | A | | 10/1998 | Prather et al. |
| 5,823,873 | A | | 10/1998 | Moody |
| 5,823,874 | A | | 10/1998 | Adams |
| D400,597 | S | | 11/1998 | Hedrick et al. |
| 5,833,537 | A | | 11/1998 | Barrie |
| 5,833,538 | A | | 11/1998 | Weiss |
| D402,702 | S | | 12/1998 | Seelig et al. |
| 5,848,932 | A | | 12/1998 | Adams |
| 5,851,148 | A | | 12/1998 | Brune et al. |
| 5,855,514 | A | | 1/1999 | Kamille |
| 5,863,249 | A | | 1/1999 | Inoue |
| 5,873,781 | A | | 2/1999 | Keane |
| D406,865 | S | | 3/1999 | Heidel |
| 5,882,261 | A | | 3/1999 | Adams |
| 5,885,157 | A | | 3/1999 | Harada et al. |
| 5,890,962 | A | | 4/1999 | Takemoto |
| 5,893,718 | A | | 4/1999 | O'Donnell |
| 5,911,418 | A | | 6/1999 | Adams et al. |
| 5,919,088 | A | * | 7/1999 | Weiss ............................ 463/9 |
| 5,927,714 | A | | 7/1999 | Kaplan |
| 5,931,467 | A | * | 8/1999 | Kamille ...................... 273/139 |
| 5,935,002 | A | | 8/1999 | Falciglia |
| 5,947,820 | A | | 9/1999 | Morro et al. |
| 5,976,015 | A | | 11/1999 | Seelig et al. |
| 5,976,016 | A | | 11/1999 | Moody et al. |
| 5,980,384 | A | | 11/1999 | Barrie |
| 5,984,782 | A | | 11/1999 | Inoue |
| 5,996,997 | A | * | 12/1999 | Kamille ...................... 273/139 |
| 5,997,400 | A | | 12/1999 | Seelig et al. |
| 5,997,401 | A | | 12/1999 | Crawford |
| 6,004,207 | A | | 12/1999 | Wilson, Jr. et al. |
| 6,007,066 | A | | 12/1999 | Moody |
| 6,015,346 | A | | 1/2000 | Bennett |
| 6,016,338 | A | | 1/2000 | Bansal et al. |
| 6,019,369 | A | | 2/2000 | Nakagawa et al. |
| 6,033,307 | A | | 3/2000 | Vancura |
| 6,045,129 | A | | 4/2000 | Cooper et al. |
| 6,056,642 | A | | 5/2000 | Bennett |
| 6,059,289 | A | | 5/2000 | Vancura |
| 6,059,658 | A | | 5/2000 | Mangano et al. |
| 6,062,979 | A | | 5/2000 | Inoue |
| 6,086,066 | A | | 7/2000 | Takeuchi et al. |
| 6,089,976 | A | | 7/2000 | Schneider et al. |
| 6,089,977 | A | | 7/2000 | Bennett |
| 6,089,978 | A | | 7/2000 | Adams et al. |
| 6,093,102 | A | | 7/2000 | Bennett |
| 6,102,798 | A | | 8/2000 | Bennett |
| 6,105,962 | A | | 8/2000 | Malavazos et al. |
| 6,113,098 | A | | 9/2000 | Adams |
| 6,120,031 | A | | 9/2000 | Adams |
| 6,120,377 | A | | 9/2000 | McGinnis, Sr. et al. |
| 6,126,542 | A | | 10/2000 | Fier |
| 6,135,884 | A | | 10/2000 | Hedrick et al. |
| 6,142,873 | A | | 11/2000 | Weiss et al. |
| 6,142,874 | A | | 11/2000 | Kodachi et al. |
| 6,149,156 | A | | 11/2000 | Feola |
| 6,159,095 | A | | 12/2000 | Frohm et al. |
| 6,159,096 | A | | 12/2000 | Yoseloff |
| 6,159,097 | A | | 12/2000 | Gura |
| 6,159,098 | A | | 12/2000 | Slomiany et al. |
| 6,162,121 | A | | 12/2000 | Morro et al. |
| 6,165,070 | A | | 12/2000 | Nolte et al. |
| 6,168,520 | B1 | | 1/2001 | Baerlocher et al. |
| 6,173,955 | B1 | | 1/2001 | Perrie et al. |
| 6,174,235 | B1 | | 1/2001 | Walker et al. |
| 6,186,894 | B1 | | 2/2001 | Mayeroff |
| 6,190,254 | B1 | | 2/2001 | Bennett |
| 6,190,255 | B1 | | 2/2001 | Thomas et al. |
| 6,203,429 | B1 | | 3/2001 | Demar et al. |
| D441,031 | S | | 4/2001 | Seelig et al. |
| 6,213,876 | B1 | | 4/2001 | Moore, Jr. |
| 6,220,593 | B1 | | 4/2001 | Pierce et al. |
| 6,224,483 | B1 | | 5/2001 | Mayeroff |
| 6,227,970 | B1 | | 5/2001 | Shimizu et al. |
| 6,231,442 | B1 | | 5/2001 | Mayeroff |
| 6,231,445 | B1 | | 5/2001 | Acres |
| 6,234,897 | B1 | | 5/2001 | Frohm et al. |
| 6,237,913 | B1 | * | 5/2001 | Kamille ...................... 273/139 |
| D443,313 | S | | 6/2001 | Brettschneider |
| 6,251,013 | B1 | | 6/2001 | Bennett |
| 6,254,481 | B1 | | 7/2001 | Jaffe |
| 6,261,177 | B1 | | 7/2001 | Bennett |
| 6,267,669 | B1 | | 7/2001 | Luciano, Jr. et al. |
| 6,270,409 | B1 | | 8/2001 | Shuster |
| 6,270,411 | B1 | | 8/2001 | Gura et al. |
| 6,270,412 | B1 | | 8/2001 | Crawford et al. |
| 6,302,790 | B1 | | 10/2001 | Brossard |
| 6,305,686 | B1 | | 10/2001 | Perrie et al. |
| 6,309,300 | B1 | | 10/2001 | Glavich |
| 6,312,334 | B1 | | 11/2001 | Yoseloff |
| 6,315,660 | B1 | | 11/2001 | DeMar et al. |
| 6,315,663 | B1 | | 11/2001 | Sakamoto |
| 6,315,664 | B1 | | 11/2001 | Baerlocher et al. |
| 6,319,123 | B1 | | 11/2001 | Paludi |
| 6,319,124 | B1 | | 11/2001 | Baerlocher et al. |
| 6,322,309 | B1 | | 11/2001 | Thomas et al. |
| 6,334,814 | B1 | | 1/2002 | Adams |
| 6,336,863 | B1 | | 1/2002 | Baerlocher et al. |

| | | | | |
|---|---|---|---|---|
| 6,338,678 | B1 | 1/2002 | Seelig et al. | |
| 6,340,158 | B2 | 1/2002 | Pierce et al. | |
| 6,346,043 | B1 | 2/2002 | Colin et al. | |
| 6,347,996 | B1 | 2/2002 | Gilmore et al. | |
| 6,358,146 | B1 * | 3/2002 | Adams | 463/20 |
| 6,364,766 | B1 | 4/2002 | Anderson et al. | |
| 6,364,767 | B1 | 4/2002 | Brossard et al. | |
| 6,368,216 | B1 | 4/2002 | Hedrick et al. | |
| 6,368,218 | B2 | 4/2002 | Angell, Jr. | |
| 6,375,187 | B1 | 4/2002 | Baerlocher et al. | |
| 6,386,974 | B1 | 5/2002 | Adams | |
| 6,398,220 | B1 | 6/2002 | Inoue | |
| 6,398,644 | B1 | 6/2002 | Perrie et al. | |
| 6,398,645 | B1 | 6/2002 | Yoseloff | |
| 6,419,579 | B1 | 7/2002 | Bennett et al. | |
| 6,428,412 | B1 | 8/2002 | Anderson et al. | |
| 6,435,500 | B2 | 8/2002 | Guimina | |
| 6,439,995 | B1 | 8/2002 | Hughs-Baird et al. | |
| 6,443,837 | B1 | 9/2002 | Jaffe et al. | |
| 6,450,884 | B1 | 9/2002 | Seelig et al. | |
| 6,461,241 | B1 | 10/2002 | Webb et al. | |
| 6,464,582 | B1 | 10/2002 | Baerlocher et al. | |
| D465,531 | S | 11/2002 | Luciano, Jr. et al. | |
| 6,481,713 | B2 | 11/2002 | Perrie et al. | |
| 6,482,089 | B2 | 11/2002 | Demar et al. | |
| 6,506,118 | B1 | 1/2003 | Baerlocher et al. | |
| 6,508,707 | B2 | 1/2003 | DeMar et al. | |
| 6,511,375 | B1 | 1/2003 | Kaminkow | |
| 6,533,658 | B1 | 3/2003 | Walker et al. | |
| 6,533,660 | B2 | 3/2003 | Seelig et al. | |
| 6,537,152 | B2 | 3/2003 | Seelig et al. | |
| 6,547,242 | B1 | 4/2003 | Sugiyama et al. | |
| 6,561,904 | B2 | 5/2003 | Locke et al. | |
| 6,569,016 | B1 * | 5/2003 | Baerlocher | 463/16 |
| 6,572,471 | B1 * | 6/2003 | Bennett | 463/16 |
| 6,575,830 | B2 | 6/2003 | Baerlocher et al. | |
| 6,582,307 | B2 | 6/2003 | Webb | |
| 6,599,185 | B1 | 7/2003 | Kaminkow et al. | |
| 6,602,135 | B1 | 8/2003 | Gerrard | |
| 6,602,137 | B2 | 8/2003 | Kaminkow et al. | |
| 6,607,437 | B2 | 8/2003 | Casey et al. | |
| 6,609,971 | B2 | 8/2003 | Vancura | |
| 6,609,972 | B2 | 8/2003 | Seelig et al. | |
| 6,645,073 | B2 | 11/2003 | Lemay et al. | |
| 6,652,378 | B2 | 11/2003 | Cannon et al. | |
| 6,656,040 | B1 | 12/2003 | Brosnan et al. | |
| 6,656,043 | B2 | 12/2003 | Seelig et al. | |
| 6,663,489 | B2 * | 12/2003 | Baerlocher | 463/20 |
| 6,676,126 | B1 * | 1/2004 | Walker et al. | 273/139 |
| 6,682,419 | B2 | 1/2004 | Webb et al. | |
| 6,682,420 | B2 | 1/2004 | Webb et al. | |
| 6,688,977 | B1 | 2/2004 | Baerlocher et al. | |
| 6,712,694 | B1 | 3/2004 | Nordman | |
| 6,715,756 | B2 | 4/2004 | Inoue | |
| 6,733,386 | B2 * | 5/2004 | Cuddy et al. | 463/17 |
| 6,749,504 | B2 | 6/2004 | Hughs-Baird | |
| 6,796,901 | B2 * | 9/2004 | Baerlocher | 463/16 |
| 6,875,108 | B1 * | 4/2005 | Hughs-Baird | 463/26 |
| 6,913,533 | B2 * | 7/2005 | Cuddy et al. | 463/16 |
| 7,160,186 | B2 * | 1/2007 | Cuddy et al. | 463/16 |
| 7,182,689 | B2 * | 2/2007 | Hughs-Baird et al. | 463/20 |
| 7,273,415 | B2 * | 9/2007 | Cregan et al. | 463/25 |
| 7,326,113 | B2 * | 2/2008 | Bennett et al. | 463/25 |
| 7,431,649 | B2 * | 10/2008 | Webb et al. | 463/25 |
| 2001/0024971 | A1 | 9/2001 | Brossard | |
| 2002/0045472 | A1 | 4/2002 | Adams | |
| 2002/0045475 | A1 | 4/2002 | Glavich et al. | |
| 2002/0094855 | A1 | 7/2002 | Berman | |
| 2002/0094856 | A1 * | 7/2002 | Bennett et al. | 463/16 |
| 2002/0094862 | A1 | 7/2002 | Inoue | |
| 2002/0142822 | A1 | 10/2002 | Baerlocher et al. | |
| 2002/0142829 | A1 | 10/2002 | Inoue | |
| 2002/0198036 | A1 | 12/2002 | Baerlocher et al. | |
| 2003/0040358 | A1 | 2/2003 | Rothkranz et al. | |
| 2003/0040360 | A1 | 2/2003 | Kaminkow | |
| 2003/0045348 | A1 | 3/2003 | Palmer et al. | |
| 2003/0045350 | A1 | 3/2003 | Baerlocher et al. | |
| 2003/0060254 | A1 | 3/2003 | Cuddy et al. | |
| 2003/0064772 | A1 | 4/2003 | Tempest et al. | |
| 2003/0064785 | A1 | 4/2003 | Stone et al. | |
| 2003/0064790 | A1 | 4/2003 | Hughs-Baird et al. | |
| 2003/0069064 | A1 | 4/2003 | Ainsworth | |
| 2003/0078089 | A1 | 4/2003 | Gary et al. | |
| 2003/0119583 | A1 | 6/2003 | Kaminkow et al. | |
| 2003/0162584 | A1 | 8/2003 | Hughs-Baird et al. | |
| 2003/0195027 | A1 | 10/2003 | Baerlocher et al. | |
| 2003/0207709 | A1 | 11/2003 | Paotrakul | |
| 2003/0207710 | A1 | 11/2003 | Rodgers et al. | |
| 2003/0232643 | A1 | 12/2003 | Inoue | |
| 2004/0000754 | A1 | 1/2004 | Inoue | |
| 2004/0002372 | A1 | 1/2004 | Rodgers et al. | |
| 2004/0002376 | A1 * | 1/2004 | Swift et al. | 463/25 |
| 2004/0009807 | A1 | 1/2004 | Miller et al. | |
| 2004/0012145 | A1 | 1/2004 | Inoue | |
| 2004/0014516 | A1 | 1/2004 | Inoue | |
| 2004/0014517 | A1 | 1/2004 | Inoue | |
| 2004/0017041 | A1 | 1/2004 | Inoue | |
| 2004/0018866 | A1 | 1/2004 | Inoue | |
| 2004/0026854 | A1 | 2/2004 | Inoue | |
| 2004/0029631 | A1 | 2/2004 | Duhamel | |
| 2004/0036218 | A1 | 2/2004 | Inoue | |
| 2004/0038726 | A1 | 2/2004 | Inoue | |
| 2004/0041340 | A1 | 3/2004 | Inoue | |
| 2004/0053658 | A1 | 3/2004 | Rothranz | |
| 2004/0053659 | A1 | 3/2004 | Rothkranz et al. | |
| 2004/0053660 | A1 * | 3/2004 | Webb et al. | 463/16 |
| 2004/0053665 | A1 * | 3/2004 | Baerlocher | 463/16 |
| 2004/0053670 | A1 | 3/2004 | Rothkranz et al. | |
| 2004/0053671 | A1 | 3/2004 | Nordman | |
| 2004/0053673 | A1 | 3/2004 | Mishra | |
| 2004/0053683 | A1 | 3/2004 | Hartl et al. | |
| 2004/0053687 | A1 | 3/2004 | Nordman et al. | |
| 2004/0072619 | A1 | 4/2004 | Brosnan et al. | |
| 2004/0121838 | A1 * | 6/2004 | Hughs-Baird et al. | 463/25 |
| 2004/0121840 | A1 | 6/2004 | Rosander et al. | |
| 2004/0150161 | A1 | 8/2004 | Inoue | |
| 2004/0152509 | A1 | 8/2004 | Hornik et al. | |
| 2004/0155399 | A1 | 8/2004 | Inoue | |
| 2004/0157658 | A1 | 8/2004 | Rothkranz | |
| 2004/0180715 | A1 | 9/2004 | Nordman | |
| 2004/0183251 | A1 | 9/2004 | Inoue | |
| 2006/0040721 | A1 * | 2/2006 | Cuddy et al. | 463/16 |
| 2006/0063584 | A1 * | 3/2006 | Brill et al. | 463/20 |

FOREIGN PATENT DOCUMENTS

| | | | |
|---|---|---|---|
| DE | 19600787 | C2 | 5/1997 |
| DE | 19613455 | C2 | 8/1997 |
| DE | 19936196 | A1 | 1/2001 |
| EP | 0 449 433 | A2 | 10/1991 |
| EP | 0 874 337 | A1 | 10/1998 |
| EP | 0 926 645 | A2 | 6/1999 |
| EP | 0 945 837 | A2 | 9/1999 |
| EP | 0 984 408 | A2 | 3/2000 |
| EP | 0 984 409 | A2 | 3/2000 |
| EP | 1 003 138 | A2 | 5/2000 |
| GB | 912 685 | | 12/1962 |
| GB | 2 117 952 | A | 10/1983 |
| GB | 2 144 644 | A | 3/1984 |
| GB | 2 137 392 | A | 10/1984 |
| GB | 2 170 636 | A | 8/1986 |
| GB | 2 201 821 | A | 9/1987 |
| GB | 2 191 030 | A | 12/1987 |
| GB | 2 322 217 | A | 8/1998 |
| GB | 2 333 880 | A | 9/1998 |
| GB | 2 383 668 | A | 11/2001 |

JP 2002-320703 11/2002
WO WO 00/12186 3/2000

OTHER PUBLICATIONS

"Jeopardy", [online] [printed Dec. 1998]. Retrieved from the Internet at <URL: www.absolute-playstation.com/api_review/rjeop.htm>.
"The Jeopardy! Database of Champions", [online] [printed before Sep. 2002]. Retrieved from the Internet at <URL:www.oddchange.com/jdoc/evrules.html>.
Mikohn Mix-N-Match Progressive Jackpot System. Circa 1992, 1993.
Progressive Jackpot System From Aristocrat Approved for Nevada, [online] [printed on Jun. 21, 2004]. Retrieved from the Internet at <URL:http://casinomagazine.com.managearticle.asp@c_290&a=518.
Thrillions, written by James Rutherford, published in Casino Journal in Apr. of 1998.
4DU Dice Unit Advertisement written by starpoint.uk.com, printed on Sep. 3, 2002.
American Bandstand Article in Slot City Times published 2002.
American Bandstand Brochure written by Anchor Games, published in 2001.
Austin Powers in Goldmember™ Advertisement written by IGT, published in 2003.
Big Shot!™ Advertisement published by Aristocrat Technologies, Inc., published in 2002.
Big Top Keno Advertisement published by Aristocrat Technologies, Inc., published in 2000.
Bingo Game Brochure written by Casino Data System, published in 1998.
Bonus Roulette Brochure written by F. Franco, published prior to Sep. 2003.
Classic Pot of Gold Brochure written by Ace Coin Equipment Ltd., published prior to Sep. 2003.
Crazy Fruits Article written by Strictly Slots, published in Apr. 2001.
Cyberdyne Gaming Brochure written by Cyberdyne Gaming, published prior to Sep. 11, 2003.
Double Diamond Girls Advertisement, written by A.C. Coin and Slot Services Company, published prior to Sep. 11, 2003.
Double up Poker Game Description written by IGT, available prior to Sep. 2000.
Elvira® Mistress of the Dark™ Advertisement written by IGT, published in 2002.
Elvis Hits Advertisement written by IGT, published in 1999.
Fortune Cookie Brochure written by IGT, published in 2000.
Full House Brochure written by Anchor Games, published in 2000.
Holy Smoke Brochure written by Impulse Gaming Ltd., published prior to Sep. 2003.
Honeymooners Advertisement, written by AC Coin & Slot, published in 2002.
High Low Card Game written by Qeocities.com, printed May 3, 2001.
In Between Game Description written by IGT, available prior to Sep. 2000.
Jack and the Beanstalk™ Article written by Strictly Slots, published Jul. 2002.
Jackpot Hotline Advertisement, written by AC Coin and Slot, published prior to Sep. 2003.
Jackpot Party Brochures written by WMS Gaming, Inc., published 1998.
Jewel in the Crown Brochure written by Barcrest, Ltd, published date unknown.
King of the Grill™ Brochure written by AC Coin & Slot, published prior to Sep. 2003.
Line-Up Brochure written by AC Coin & Slot, published prior to Sep. 2003.
Little Green Men Jr.™ Advertisement written by AC Coin & Slot, published prior to Sep. 2003.
Little Green Men Jr.™ Article written by Strictly Slots, published in Feb. 2003.
Magic 8 Ball Advertisement written by IGT, published in 2002.
Miss America Brochure written by AC Coin & Slot, published prior to Sep. 11, 2003.
Mix and Match Advertisement published by AC Coin & Slot, published prior to Sep. 2003.
Mix and Match Article written by Strictly Slots, published in Apr. 2002.
Money Grab Article written by Strictly Slots, published in Apr. 2001.
Money to Burn Brochure written by WMS Gaming, Inc., published prior to 2001.
Monster Match Advertisement by Strictly Slots, published prior to Sep. 9, 2003.
Monster Match Article, written by Strictly Slots, published in Jan. 2002.
Monte Carlo Advertisement written by Bally Gaming, published prior to Sep. 2002.
On The Money! Article written by Strictly Slots, published in Dec. 2000.
Payout!™ Advertisement written by www.csds.com/Gaming/Products /g Payout.htm, printed on Jan. 15, 2001.
Payout!™ Article written by Casino Data Systems, published prior to Sep. 2003.
Pick a Prize Brochure written by Acres Gaming Incorporated, published prior to 2001.
Plinko Showcase Show Down written by International Game Technology, published in 2001.
Power Slotto Brochure published by AC Coin & Slot prior to 2002.
Press Your Luck Brochure published by AC Coin & Slot prior to 2002.
Quick Pick Paytime Brochure written by Acres Gaming Incorporated, published prior to 2001.
R&B™ Brochure published by AC Coin & Slot, published prior to Sep. 2003.
Reel Dice Advertisement written by Gerber & Glass, published in 1936.
Royal Roulette Brochure written by Impulse Gaming Ltd., published prior to Sep. 2003.
Run For Your Money Game Description written by Barcrest, published prior to 2001.
Silver City Roundup Brochure published by AC Coin & Slot, published prior to Sep. 2003.
Slot Machine Buyer's Handbook, A Consumer's Guide to Slot Machines written by David L. Saul and Daniel R. Mead, published in 1998.
Slot Machines [In Part] written by Marshal Fey, published 1997.
Slot Machines A Pictorial History of the First 100 Years, 5th edition written by Marshall Fey, published in 1983-1997.
Slot Machines and Coin-Op Games written by Bill Kurtz, pp. 16, 65, 105 and 111, 1991.
Slot Machines on Parade, 1st edition written by Robert N. Geddes and illustrated by Daniel R. Mead, published in 1980.
Sphinx Brochure written by Atronic Casino Technology, Ltd., published in 1997.
Spin Til You Win Information Sheet written by IGT, published in 1996.
Spin-A-Lot Brochure written by Acres Gaming Incorporated, published prior to 2001.
Take Your Pick Article written by Strictly Slots, published in Mar. 2001.
Take Your Pick Brochure written by Anchor Games, published in 1999.
Top Dollar Brochure written by IGT, published in 1998.
Wheel & Deal Brochure written by Strictly Slots, published in Dec. 2001.
Wheel of Fortune Advertisement written by IGT, published in 1998.
Wheel Poker Article, written by Strictly Slots, published prior to 2002.
Yahtzee Bonus Advertisement written by Mikohn, published in 1999.
Buck's Roulette Brochure written by R. Franco, published prior to Sep. 2003.
Chariot's of Fortune Brochure written by R. Franco, published prior to Sep. 2003.
Lemons, Cherries and Bell-Fruit-Gum written by Richard M. Bueschel, pp. 39-41, 64, 70, 137, 149-150, 195-196 and 251, 1995.

* cited by examiner

GAMING DEVICE WITH MULTIPLE LEVELS WHICH DETERMINE THE NUMBER OF INDICATORS OF A SYMBOL GENERATOR

PRIORITY CLAIM

This application is a continuation-in-part of and claims the benefit of U.S. patent application Ser. No. 10/243,047, filed Sep. 12, 2002 now U.S. Pat. No. 7,273,415 which is a continuation-in-part of and claims the benefit of U.S. patent application Ser. No. 10/195,292, filed Jul. 15, 2002, now U.S. Pat. No. 6,595,854, which is a continuation of and claims the benefit of U.S. patent application Ser. No. 09/656,702, filed Sep. 7, 2000, now U.S. Pat. No. 6,439,995, the entire contents of which are incorporated herein.

COPYRIGHT NOTICE

A portion of the disclosure of this patent document contains material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and in particular to a gaming device having a multiple levels which determine the number of indicators of a symbol generator.

BACKGROUND OF THE INVENTION

Gaming machines currently exist with bonus schemes in which the player has one or more opportunities to choose a particular selection or symbol from a group of symbols. The symbols may be any symbol or image such as a number, letter or graphical representation of a person, place or thing. When a player chooses a symbol, existing games will either award the player a bonus value or terminate the bonus round. The outcome depends upon the particular symbol selected by the player.

In existing games, when the player selects a symbol that awards a bonus value (hereinafter referred to as "award indicator" or an "outcome indicator"), the player receives the value, and the player has another chance to select another symbol. Each time the player selects an award indicator, the game prompts the player to make another selection. The bonus round continues and the player may choose another symbol. The player then selects another symbol, and this process continues until the player selects a symbol which terminates the bonus round (hereinafter referred to as an "end-bonus indicator").

When the player selects an end-bonus indicator, often the game displays a message such as "COLLECT." This message means that the bonus round has terminated, and the player collects any bonus values the player accumulated.

Gaming machines with this type of bonus scheme are programmed so that in each bonus round a certain number of symbols are award indicators and a certain number of symbols are end-bonus indicators. For example, European Patent Application No. EP 0 945 837 A2 filed on Mar. 18, 1999, which is assigned on its face to WMS Gaming, Inc. discloses a bonus scheme generally of this type. This application discloses a bonus scheme where the player selects "value-associated outcomes" from a bonus game with a finite number of selections until selecting an "end-bonus" outcome. While this bonus scheme offers advantages in player appeal and excitement, there is a continuing need to develop new types of bonus games, which further enhance the level of player excitement and enjoyment.

SUMMARY OF THE INVENTION

The apparatus and method of the present invention provides a gaming device having a bonus round with multiple selection groups. The bonus round does not end upon an end-bonus indicator; rather, the bonus round ends when the player chooses a predetermined number of selections from the last or final selection group. The last or final selection group includes an award indicator associated with each selection. In one preferred embodiment of the present invention, the number of player choices or picks in the final selection group (referred to herein as "final selection group picks" or "picks") is determined from a selection group preceding the final selection group. However, it should be appreciated that the number of picks could be determined in any suitable manner.

More specifically, each bonus round of the bonus scheme of the present invention consists of at least one and possibly many displays. Each display may contain one or more selection groups. There are generally two types of selection groups: (i) a final selection group that preferably contains only award indicators; and all other (ii) selection groups that contain award indicators and other types of indicators. There are generally three types of indicators: (i) indicators showing game credits or a bonus value or award (herein referred to as "award indicators"); (ii) indicators advancing a player to another selection group (herein referred to as "advance indicators"); and (iii) indicators designating the number of picks the player has from the final selection group (herein referred to as "picks indicators"). It should be appreciated that in certain embodiments of the present invention, the award, advance and picks indicators could be combined. The indicators are initially masked by symbols or indicia, and the masked indicia are referred to herein as a "selection" or "selections." When a player chooses a selection, the game removes the indicia and displays or exhibits the indicator to the player.

The initial selection groups preferably contain award indicators and at least one advance indicator. There may be any number of initial selection groups. The number depends upon a bonus round theme designed to further enhance player excitement and enjoyment. Likewise, the game theme determines the number of indicators that any of the above mentioned groups contain. The selection group prior to the final selection group preferably contains at least one award indicator and at least one picks indicator. The final selection group only contains award indicators, which preferably have, on average, higher values than the prior selection groups.

Accordingly, prior to determining the number of picks, one embodiment of the present invention provides the player with at least one selection group in which the player chooses selections which are award indicators until the player chooses an advance indicator that advances the player to the next selection group. Player excitement and enjoyment is enhanced because the present invention provides the player with multiple opportunities to achieve game credits and because the player is guaranteed to have at least one opportunity to select from the final selection group. In one embodiment of the present invention, the final selection group has larger values than the previous selection groups.

In one embodiment, all of the selection groups are contained in one display shown on a video monitor. In another embodiment, the bonus round employs multiple displays, one after another, which may contain one or more selection groups. The game theme determines whether the bonus round employs one or several displays.

In one embodiment, the player selects award indicators from at least one initial selection group until the player selects an advance indicator and moves on to another selection group. When the player is at the selection group prior to the final selection group, the player selects award indicators until the player selects a picks indicator, which determines the number of picks the player will have from the final selection group. The player makes the predetermined number of picks from the final selection group which terminates the bonus round. A separate bonus meter and credit display update the player's game credit accumulation during the bonus round and the player's total credits, respectively. When the bonus round ends, the player returns to the normal operation of the gaming device.

In another embodiment, the player initially selects award indicators from a selection group (containing a picks indicator) until the player selects the picks indicator. The player then advances through a number of selection groups containing award indicators and advance indicators until reaching the final selection group.

In another embodiment of the present invention, the bonus scheme contains multiple selection groups that have picks indicators. The selection groups containing picks indicators could also contain advance indicators. In this embodiment, the game accumulates the bonus picks, which could be shown on a separate meter or counter, until the player advances to the final selection group.

In a further embodiment of the present invention, the bonus round does not terminate upon selection from the final selection group if a contingency occurs. For instance, if the player's bonus credit at the end of the round is below a predetermined limit, the game provides the player with another round of selection groups including a final selection group. It should be appreciated that all of the embodiments of the present invention preferably terminate with a final selection group that contains only award indicators.

It is therefore an object of one embodiment of the present invention to provide a gaming device having a bonus round that provides a player with multiple opportunities to achieve game credits and to guarantee the player of having at least one opportunity to select from a final selection group.

In another embodiment, the gaming device provides at least one award generator which is operable to select, generate or indicate and provide a player one or more awards associated with the award generator. In this embodiment, based on one or more player picked selections picked, the gaming device is operable to select or indicate one or more activator symbols from one or more sets of activator symbols. Each activator symbol corresponds to one or more aspects of how any awards to be provided to the player are determined. After at least one activator symbol is selected, the award generator is activated and based on the indicated activator symbol, the activated award generator selects, indicates or generates one or more awards or other outcomes which are provided to the player.

In one embodiment, the award generator is a video or mechanical wheel with a plurality of sections and one or more section indicators. In this embodiment, each section displays an award or an award symbol which is associated with one or more awards. The awards may be values, prizes, modifiers or multipliers, free spins, free games, game elements or any other suitable type of award. In one embodiment, the award generator is a mechanical wheel that is attached to the cabinet of the gaming device. In another embodiment, the award generator is in a suitable video format which is displayed via one or more display devices. It should be appreciated that wheels, reels, dice, selections or any other suitable award indicating or award generating device may be utilized in the present invention.

In one embodiment, in addition to the award generator, the gaming device also provides a plurality of activator symbol sets or levels. Each activator symbol set or level includes a plurality of activator symbols. Each activator symbol relates or corresponds to one or more functions, characteristics or aspects of how any awards or other outcomes to be provided to the player are determined. In one embodiment, each of the activator symbols relates or corresponds to the number of section indicators which will be activated to indicate an award for one or more activations of the award generator. For example, one activator symbol may be associated with one section indicator of the award generator, another activator symbol may be associated with another section indicator of the award generator and another activator symbol may be associated with two section indicators of the award generator. In another embodiment, each of the activator symbols relates or corresponds to the number of activations or spins of the award generator. For example, one activator symbol may be associated with one activation of the award generator, another activator symbol may be associated with five activations of the award generator and another activator symbol may be associated with ten activations of the award generator.

In one embodiment, one or more of the different sets or levels of activator symbols correspond, on average, with a different average award or payout provided to the player than another set of activator symbols. That is, as the player advances from one set of activator symbols to another set of activator symbols, the different sets of activator symbols have different average total awards or total payouts which will ultimately be provided to the player. For example, if the activator symbols in a first level of activator symbols average four activations of the award generator and the activator symbols in a second level of activator symbols average ten activations of the award generator, then the second level of activator symbols is associated with a higher average award or payout than the first level of activator symbols. That is, as the number of activations of the award generator relates to the number of awards provided to the player (i.e., each activation provides the player at least one award) and the greater the number of awards provided to the player, the greater the average total award or total payout, in this example, the second level of activator symbols will provide the player more awards and thus a greater average total award or total payout than the first level of activator symbols. In another example, if the activator symbols in a first level of activator symbols average two active section indicators of the award generator and the activator symbols in a second level of activator symbols average three active section indicators of the award generator, then the second level of activator symbols is associated with a higher average award or payout than the first level of activator symbols. In this example, as the number of active section indicators relates to the number of awards provided to the player (i.e., each active section indicator provides the player one award) and the greater the number of awards provided to the player, the greater the average total award or total payout, the second level of activator symbols will provide the player more awards and thus a greater average total award or total payout than the first level of activator symbols. In another embodiment, one or more of the different sets or levels of activator symbols correspond, on average, with the same average award provided to the player as one or more other sets of activator symbols.

In one embodiment, the gaming device is operable to display the plurality of activator symbol sets or levels to the player via one or more activator symbol indicating devices. In one embodiment, each different activator symbol set is displayed on a different side, level or display of an activator symbol indicating device. In one embodiment, the activator symbol indicating device may be the device disclosed in U.S. Pat. No. 6,712,694 or any other suitable device.

In one embodiment, as discussed above, the gaming device provides a plurality of selection groups, levels or sets including a final selection group and one or more non-final selection groups. Each selection group includes a plurality of selections. Each selection in each non-final selection group is associated with either an advance indicator or an initiator and each selection in the final selection group is associated with an initiator. The gaming device does not initially display whether each selection is associated with an advance indicator or an initiator. In this embodiment, each advance indicator advances the player to pick from another selection group and each initiator causes the selection of an activator symbol and the subsequent generation of at least one award. It should be appreciated that, in one embodiment, each level or group of selections is associated with one of the levels or sets of activator symbols.

In operation, upon or after a suitable triggering event, the gaming device enables the player to pick one selection from a first, non-final selection group. The first, non-final selection group is associated with a first activator symbol set or level which is displayed to the player (e.g., via the activator symbol indicating device). The gaming device reveals the advance indicator or initiator associated with the player picked selection.

If an advance indicator is revealed, the gaming device advances the player to another selection group. That is, the gaming device displays a different, subsequent group or level of selections and enables the player to pick one selection from the different group or level of selections. In addition to advancing the player to another group or level of selections, in one embodiment, the gaming device advances the player to another set or level of activator symbols, if any, associated with the subsequent displayed group of selections. For example, if an advance indicator is revealed to be associated with the player picked selection from the first selection group, the gaming device enables the player to pick one selection from a second selection group and advances the player from a first set of activator symbol to a second set of activator symbols associated with the second selection group.

In this embodiment, the gaming device enables the player to pick one selection from the subsequent group or level of selections to reveal either an advance indicator or an initiator. This process continues as described above until an initiator is revealed. It should be appreciated that, in one embodiment, as each selection in the final selection group is associated with an initiator, the player will inevitably pick a selection that reveals an associated initiator.

If an initiator is revealed, the gaming device indicates or selects one of the activator symbols from the activator symbol set associated with the group of selections including the revealed initiator. For example, if the player's first selection pick revealed an initiator, the gaming device indicates one of the activator symbols from the first activator symbol set. On the other hand, if the player's first selection pick revealed an advance indicator and the player's next selection pick from a second set of selections revealed an initiator, the gaming device indicates one of the activator symbols from the second activator symbol set associated with the second set of selections.

After indicating one of the activator symbols, the gaming device activates the award generator. The activation of the award generator is based, at least in part, on the indicated activator symbol. That is, as each activator symbol corresponds to at least one aspect of how any award to be provided to the player is determined, the indicated activator symbol influences, at least in part, the activated award generator. In this embodiment, any award(s) determined via the award generator are provided to the player and the game ends. For example, if the indicated activator symbol is associated with a number of active section indicators, then that associated number of section indicators are active for each activation of the award generator. In this example, the gaming device determines the awards indicated by each active section indicator and provides the player any indicated awards. In another example, if the indicated activator symbol is associated with a number of activations of the award generator, then the award generator is activated that associated number of times. In this example, the gaming device determines any awards indicated by each active section indicator for each activation of the award generator and provides the player any indicated awards.

In an alternative embodiment, each of the awards adapted to be generated by the award generator is associated with a characteristic, such as a color. In this embodiment, the final selection group includes at least one advance indicator. If the player advances to the final selection group and picks the selection associated with an advance indicator, in one embodiment, the gaming device bypasses the selection of an activator symbol and proceeds to activate the award generator. The activated award generator generates or indicates one award and the gaming device provides the player the generated award as well as every other award associated with the same characteristic as the generated award. For example, if the player picks an advance indicator in the final selection group, the gaming device activates the award generator to generate an award which is associated with the color red. The gaming device subsequently provides the player each of the awards associated with the color red and ends the game.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device

Figure 1:
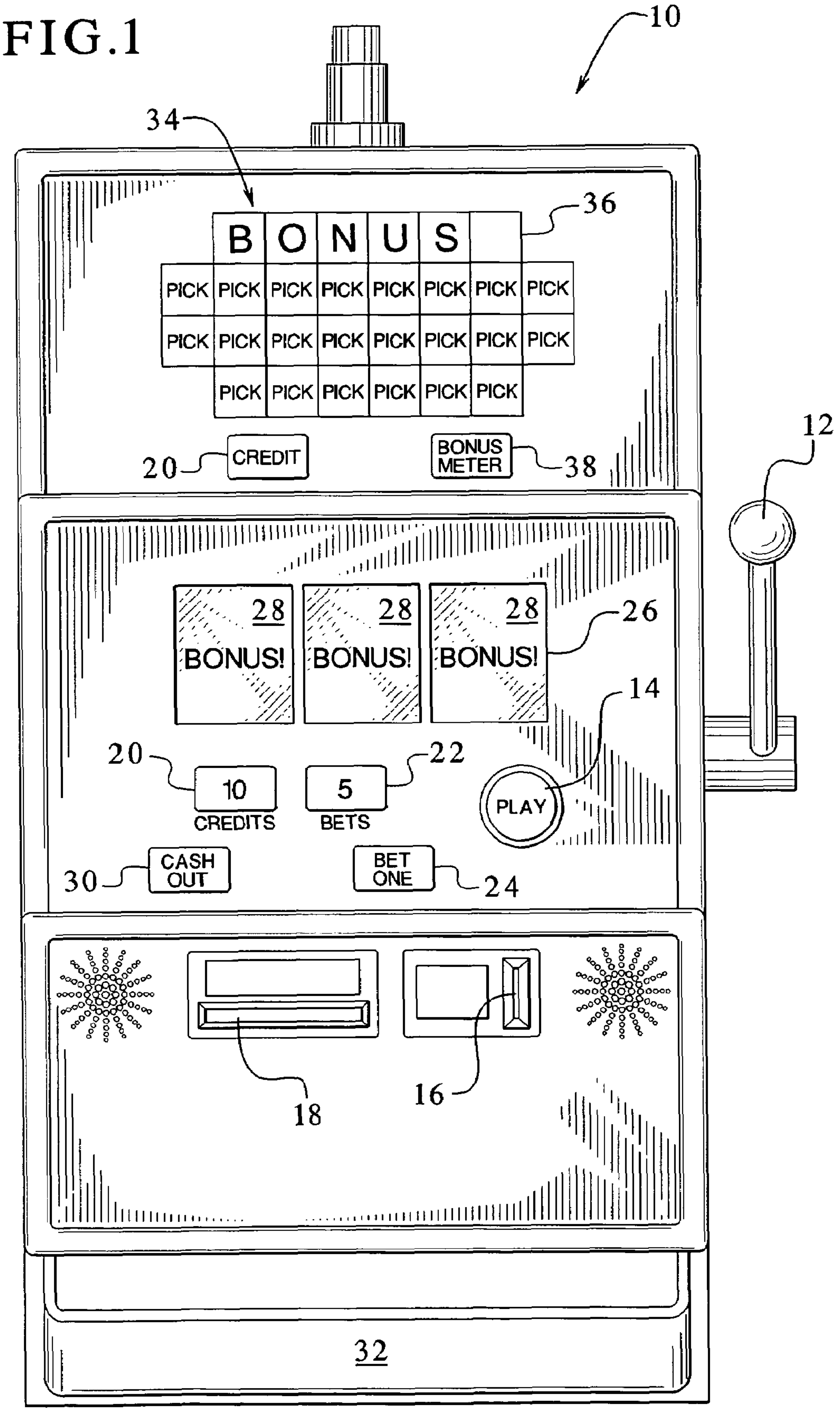
FIG. 1 is a front elevational view of a gaming device having a bonus round with multiple selection groups.

Referring now to the drawings, FIG. 1 generally illustrates a gaming device or "game" commonly referred to as a slot machine, which incorporates the bonus scheme of the present invention. A player may play the slot machine 10 by pulling an arm 12 or by pushing a play button 14. The player operates the slot machine 10 by placing coins in the coin slot 16 or paper money in the bill acceptor 18. Other devices for accepting payment such as readers or validators for credit cards or debt cards could be used. When a player puts money in the slot machine 10, a number of credits corresponding to the amount deposited is shown in a credit display 20.

The slot machine 10 also includes a bet display 22 and a bet one button 24. The player places a bet by pushing the bet one button 24 and increases the bet by one credit each time the player pushes the bet one button 24. When the player pushes the bet one button 24, the number of credits shown in the credit display 20 decreases by one, and the number of credits shown in the bet display 22 increases by one.

The slot machine 10 has a payout display 26 that contains a plurality of reels 28. Slot machines commonly employ three to five reels that are either mechanical or simulated. Each reel has a plurality of indicia such as bells, hearts, fruits, numbers, letters, bars, etc. that preferably correspond to a theme associated with the slot machine 10. When the player pulls the arm 12 or pushes the play button 14, the reels 28 begin to spin. The reels spin until the processor or controller of the slot machine 10 halts the reels individually or in any combination programmed into the controller. When all the reels stop spinning, the combination of indicia from each reel triggers a bonus round if the combination matches a combination programmed into the controller. FIG. 1 illustrates a possible triggering combination wherein all the reels of the payout display 26 show indicia containing the word "BONUS." It should be appreciated that any combination of indicia could be programmed into the controller of the slot machine 10 to trigger the bonus round.

A player may "cash out" and thereby receive a number of coins corresponding to the number of credits at any time by pushing a cash out button 30. When the player "cashes out", the player receives the coins in a coin payout tray 32. The slot machine 10 may employ other payout mechanisms such as credit slips redeemable by a cashier or electronically recordable cards that keep tract of the player's credits. It should also be appreciated that while the bonus scheme of the present invention will be described for use with a slot machine, other gaming devices such as a video card game could employ the bonus scheme of the present invention.

Bonus Scheme Components

Referring still to FIG. 1, the bonus scheme of the present invention, generally indicated by the number 34, includes a controller described below, a display 36, a bonus meter display 38, and the credit display 20, described above. Alternatively, the bonus scheme could function without either the bonus meter or the credit display. A single, a plurality, or all of the selection groups may appear on a single screen or display or multiple screens or displays.

The bonus scheme 34 may contain one or more rounds. Each round contains at least two selection groups, including a final selection group. Each selection group contains a plurality of selections that remain masked until chosen by a player. The number of rounds, the number of selection groups per round, and the number of selections per selection group may vary as desired by the implementor of the gaming device to maximize player excitement and enjoyment. The rounds, the selection groups, and the selections are discussed in detail below.

Figure 2:
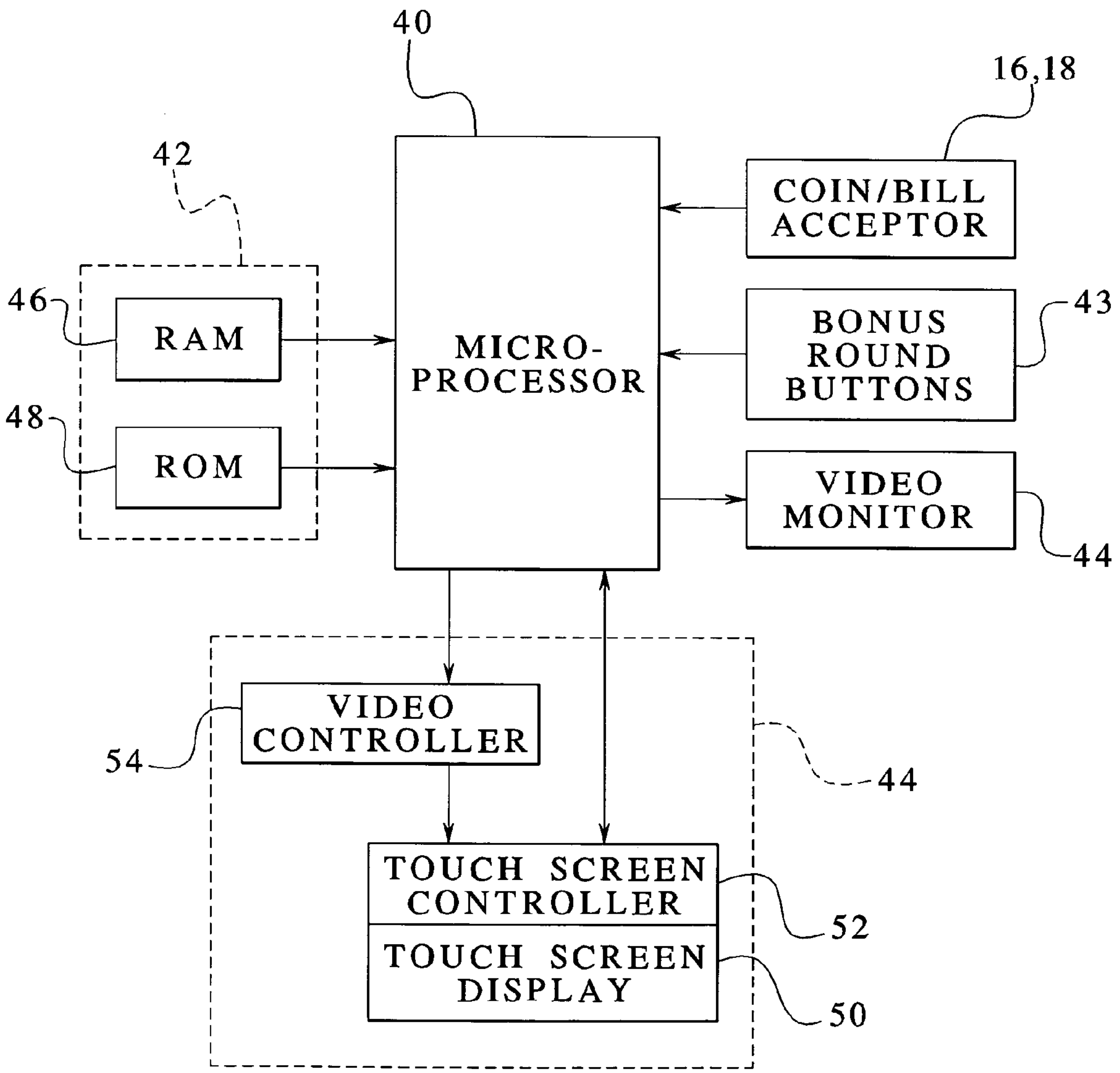
FIG. 2 is a schematic diagram of the controller of one embodiment of the present invention.

The controller of slot machine 10 preferably has the electronic configuration generally illustrated in FIG. 2, which includes: a processor 40; a memory device 42 for storing program code or other data; a video monitor 44 such as a cathode ray tube ("CRT") or a liquid crystal display ("LCD") for displaying items such as the selection groups; and at least one input device such as the arm 12, the play button 14, the bet one button 24, and the cash out button 30. In the present invention, the controller determines the random positions and the values for the selections in the various selection groups. The controller preferably maintains the placement of the selections until the bonus rounds end. The controller preferably determines and maintains a different random positioning each time the player plays the bonus round.

The processor 40 is preferably a microprocessor or microcontroller-based platform which is capable of displaying images, symbols and other indicia such as images of people, characters, places, things and faces of cards. The processor 40 can control the coin slot 16 and the bill acceptor 18 and be programmed to require the player to deposit a certain amount of money to start the game. The memory device 42 typically includes random access memory ("RAM") 46 for storing event data or other data generated or used during a particular game. The memory device 42 can also include read only memory ("ROM") 48 to store program code so that slot machine 10 plays a particular game in accordance with applicable game rules and pay tables.

The game could employ separate electro-mechanical bonus round buttons shown only figuratively in block 43 to input signals from the bonus round into the processor 40. In this embodiment, video monitor 44 would merely display the display screens, selection groups, and selections and would also show the indicators when the player unmasks a selection. However, it is preferable that a touch screen 50 and an associated touch screen controller 52 are used as an integral part of video monitor 44 instead of the conventional video monitor 44. The touch screen 50 and the touch screen controller 52 are connected to a video controller 54 and the processor 40. The player can make decisions and input signals into the processor 40 by touching the touch screen 50 at places representing the selections of the selection groups.

It should be appreciated that although the processor 40 and the memory device 42 are preferable implementations of the present invention, the present invention can also be implemented using one or more application-specific integrated circuits ("ASIC's") or other hard-wired devices, or using mechanical devices. Furthermore, although the processor 40 and memory device 42 preferably reside on each slot machine 10, it is possible to provide some or all of their functions at a central location such as a network server for communication to a playing station such as over a local area network ("LAN"), wide area network ("WAN"), Internet connection, microwave link, and the like. Such systems are also referred to herein as a processor.

Bonus Scheme Selection Groups

Figure 3:
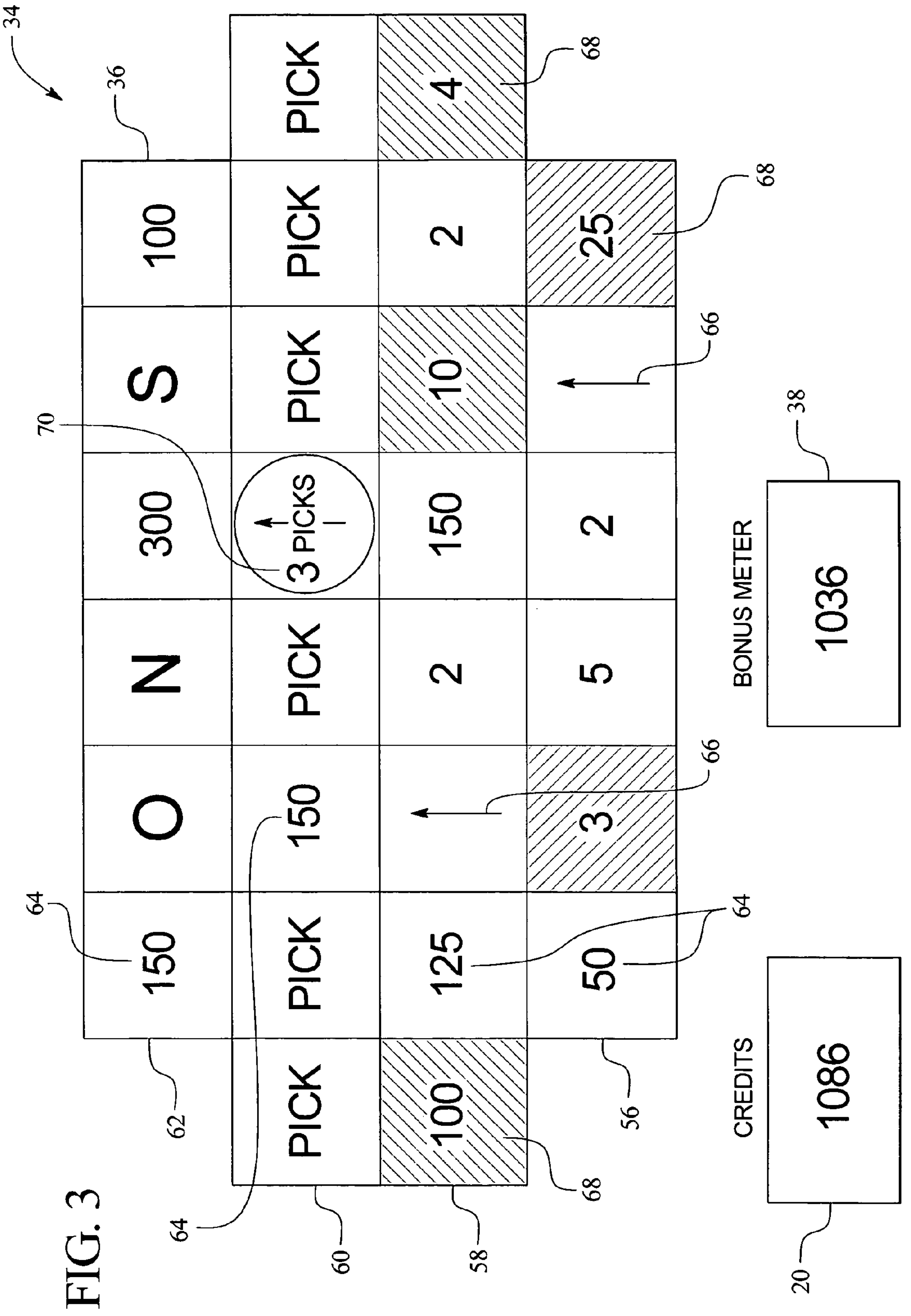
FIG. 3 is a front elevational view of a bonus display embodiment of the gaming device having a single screen with multiple selection groups.

FIG. 3 shows one embodiment of the bonus scheme 34 of the present invention, which includes all the selection groups in one display 36. In this embodiment, the selection groups are four adjacent horizontally extending rows of selections. The selection groups can have any configuration, but preferably, the game enhances player enjoyment during the bonus round by configuring the selection groups according to a predetermined game theme. In this embodiment, the display 36 is intended to emulate the game board from the popular television game show WHEEL OF FORTUNE™. WHEEL OF FORTUNE™ is a trademark of Califon Productions, Inc., Culver City Calif., used with permission by the assignee of the present invention.

Referring now to FIG. 1, each bonus round includes a plurality of selection groups, and the game initially masks or hides every selection of the selection groups with indicia, preferably conforming to the game theme, until the player selects and reveals the selection. FIG. 1 shows all the selections covered by letters making up the word "B-O-N-U-S" or by the word "PICK." The player does not know the content of a selection until picking it. In this embodiment the four selection groups are in one display 36, however, in another embodiment the selection groups appear in a plurality of displays, as described below.

FIG. 3 shows an example of a display 36 as it would appear after the player plays the bonus round. The display 36 contains four rows of selection groups 56, 58, 60 and 62. Each row or selection group has a plurality of selections (either masked or unmasked). Rows 56, 58, 60 and 62 all contain award indicators 64, having indicia corresponding to a number of credits or a multiplier value that the player receives for choosing the selection. The indicia are preferably numbers as shown but could also be a plurality of items such as fruits, bells, or bars, etc., the number of which represents a number of credits or a multiplier value. Rows 56, 58 and 60 also contain advance indicators 66 that point to another selection group and inform the player that the player may no longer select from the current selection group and must move to the next selection group. The embodiment in display 36 employs arrows that direct the player to advance to the selection group directly above the current selection group. Alternatively, the advance indicators may award credits or multipliers to a player as well as direct the player to the next selection group. In bonus round 34, the player begins in the bottom selection group 56 and advances upwardly until ending with the last selection group 62.

In FIG. 3, selection groups 56 and 58 contain a number of revealed selections 68 with angled hatching. The angled hatching designates selections that the player did not pick before choosing an advance indicator 66. It should be appreciated that to increase the enjoyment and excitement of the bonus round, the game may show the player the values the player could have chosen. This display could take place at the end of selecting from each selection group or at the end of the bonus round. Alternatively, the game could keep the selections masked as illustrated in selection groups 60 and 62. It should be appreciated that the game could reveal selections in any suitable manner.

Selection group 60 is the selection group before the final selection group 62. Selection group 60 preferably contains at least one picks indicator 70, which is preferably a number as shown but could also be any suitable symbol such as fruits, bells, or bars, etc. The picks number 70 represents the number of picks that the player will have from the final selection group 62. Preferably, selection group 60 contains more than one picks indicator 70 and one or more award indicators 64.

The picks indicator 70 includes indicia as shown in FIG. 3 with the word "picks". Also, the picks indicator may contain indicia that points to the final selection group, shown in FIG. 3 as an arrow, or may otherwise inform the player to move to the final selection group. In an alternative embodiment of the present invention, the game replaces the arrow of picks indicator 70 and the advance indicator 66 by changing the display 36.

In an alternative embodiment, the picks indicator 70 is replaced with an additional advance indicator, which directs the player to the final selection group. The additional advance indicator may also award the player credits or multipliers. The game randomly selects the number of picks that the player will have when the player reaches the final selection group at or before the time when the player selects the picks indicator. The game may determine the number of picks at the beginning of the bonus round or upon the picks indicator selection.

The final selection group 62 preferably contains only award indicators or multiplier values 64. The bonus round ends after the player makes the number of selections from the final selection group 62 equal to the picks indicator 70 in the selection group 60. In general, to increase player enjoyment, each selection group contains award indicators having, on average, higher values than the preceding selection group. The final selection group is preferably the most lucrative group, making the picks indicator 70 the key to the player's success in the bonus round 34. The higher the picks indicator, the more chances the player has to select from the lucrative final selection group 60.

As the player obtains award indicators 64, the bonus meter 38 tallies the selections. At the end of the bonus round 34, the bonus meter 38 will show the player the total credits earned during the bonus round. Preferably, the bonus meter does not tally the picks indicator value since this indicator does not represent game credits. In an alternative embodiment, the picks indicator 70 could also award credits as does the award indicator 64. Additionally, the game may provide a second credit display 20 in close proximity to the display 36 so that the player may easily see the player's total credits. Alternatively, the credit display 20 in close proximity to the display could be the only credit display that the game provides. It should be appreciated that neither the bonus meter 38 nor the credit display 20 are critical to the bonus round 34.

Bonus Round Sequence

Figure 4:
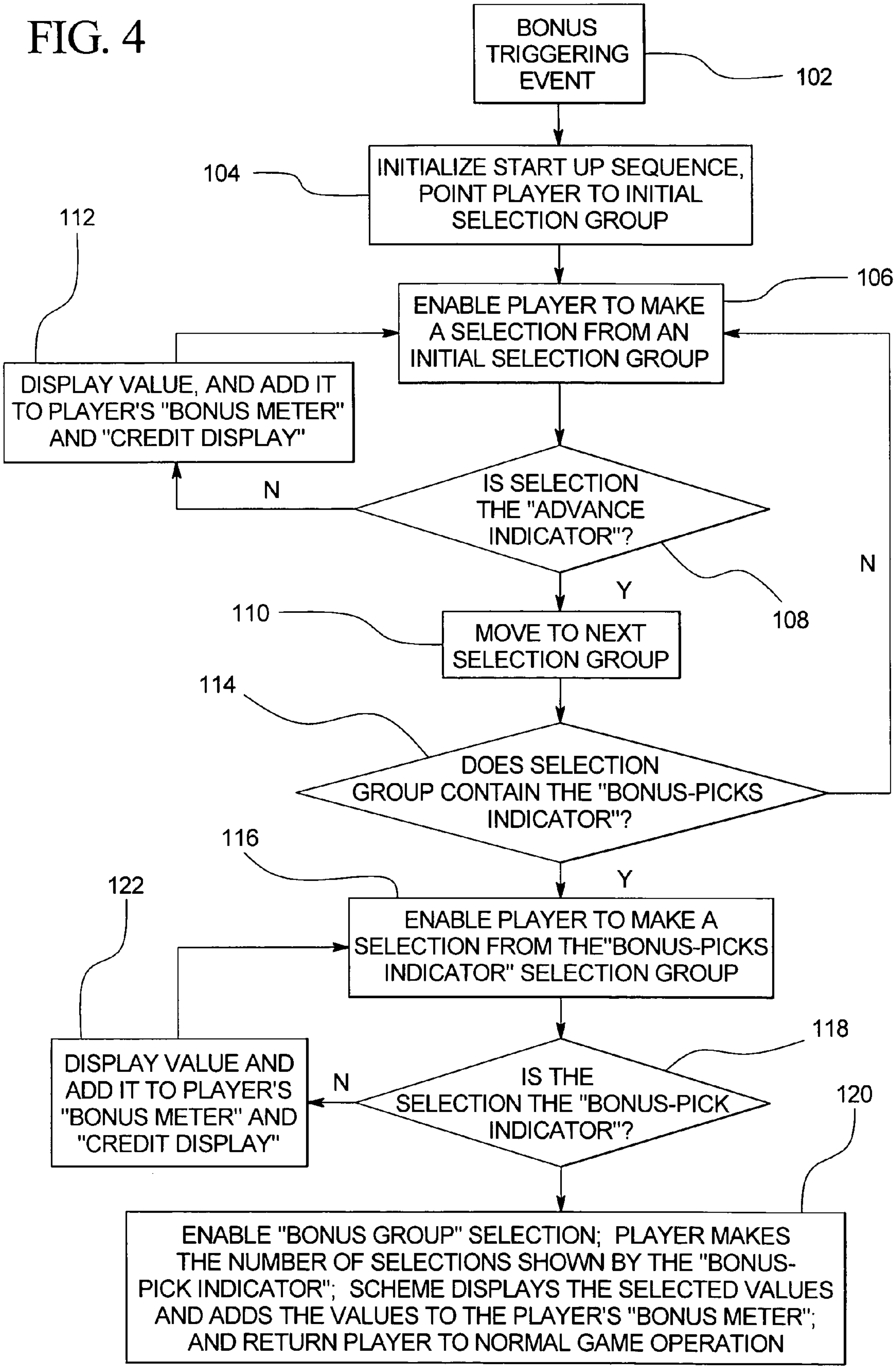
FIG. 4 is a flow diagram of the preferred embodiment of the bonus scheme of the present invention.

FIG. 4 illustrates the preferred embodiment. Upon a bonus round triggering event as indicated by block 102, the game preferably increases player enjoyment by showing the player an initialization of the bonus round as indicated by block 104. For instance, the game may leave the video monitor 44 or the touch screen 50 (FIG. 2) of the game blank until the triggering event occurs. Alternatively, the game could indicate that the display 36 (FIG. 3) is "thinking" of the indicators to place behind the masked selection groups 56, 58, 60 and 62. At the end of the initialization, the game directs the player to the initial or first selection group as indicated by block 104.

As described above with FIG. 3, the selection groups 56 and 58 contain a plurality of award indicators 64 and at least one advance indicator 66. The player chooses a masked selection from the selection group 56 as indicated by block 106. The game unmasks the selection and shows the player the indicator. If the selection is an advance indicator 66 as indicated by diamond 108, the player is directed to the next selection group as indicated by block 110. If the selection is not an advance indicator 66 as indicated by diamond 108, then the selection is preferably an award indicator 64. If so, the game displays the value of the award indicator and adds the value to the player's bonus meter 38 and credit display 20 as indicated by block 112 and enables the player to make another selection from the initial selection group as indicated by block 106.

The present invention contemplates using any suitable visible means to direct the player to make another selection from the current selection group such as highlighting the selection group until the game no longer enables the player to select from that group, at which time the game highlights the next selection group. Alternatively, the game may employ a separate "pick again" indicator that lights until the player makes another selection from the current selection group. The invention also contemplates using any suitable audible signals to direct the player to choose from a current selection group or otherwise to choose from another selection group.

The player will inevitably choose an advance indicator in the initial selection group as indicated by diamond 108. The player wants to prolong the selection process to accumulate as many credits as possible before advancement. Game excitement and enjoyment increases as the player selects from the selection groups because the odds of choosing the advance indicator 66 increases as the number of selections remaining in the selection group decreases. This distinguishes the final selection group described above with respect to FIG. 3, in which the number of picks is known before selecting from it.

After the player moves to the next selection group as indicated by block 110, the game determines if the selection group contains a picks indicator 70 (FIG. 3) as indicated by diamond 114. If not, then the selection group contains an advance indicator, and the game enables the player to proceed as before as indicated by block 106, diamond 108, block 110 and block 112. The present invention preferably enables the player to advance through any number of selection groups before reaching the last selection group. FIG. 3 shows three selection groups 56, 58 and 60 before the final selection group 62, however, the game could provide for any number of selection groups before the final selection group.

Upon reaching the selection group 60 containing a picks indicator 70 as indicated by diamond 114, the game enables the player to make a selection from this selection group as indicated by block 116. The game unmasks the selection and shows the player the indicator. If the selection is a picks indicator 70 as indicated by diamond 118, the player is directed to the final selection group 62 as indicated by block 120. If the selection is not a picks indicator as indicated by diamond 118, then the selection preferably is an award indicator 64. If so, the game displays the value of the award and adds the value to the player's bonus meter 38 and credit display 20 as indicated by block 122 and enables the player to make another selection from the selection group as indicated by block 116.

The player will inevitably select a picks indicator from a selection group as indicated by diamond 118. The player wants to prolong the selection so as to accumulate as many credits as possible before advancement. Game excitement and enjoyment increases as the player selects from the selection group 60 (having the picks indicator) because the odds of choosing a picks indicator increases as the number of remaining selections decreases.

Upon selecting the picks indicator 70 as indicated by diamond 118, the game enables the player to make selections from the final selection group 62 as indicated by block 120. As stated earlier, the picks indicator 70 represents the number of picks that the player will have from the final selection group 62. When the player makes the predetermined number of selections, the game unmasks the award indicators 64 and shows the player the values. The game adds the values to the player's bonus meter 38 and credit display 20 and ends the bonus round 34 by returning the player to normal game operation.

Selecting from the final selection group 62 of the bonus round 34 involves making the predetermined number of selections. The object is to choose the most valuable indicators in the final selection group 62. When the player finishes making the selections, the game may reveal the unselected selections, as described above, to increase player enjoyment. When the bonus round 34 ends, the game resets the bonus round by blanking the video monitor 44 or the touch screen 50 (FIG. 2) or by otherwise masking the indicators of selection screen 36.

In one example illustrated by FIG. 3, a player playing a slot machine enters a bonus round when a set of reels of the gaming machine displays "BONUS", "BONUS" and BONUS." The game initializes the bonus round 34 and directs the player to the initial selection group 56. The player randomly selects the "5", the "50", the "2", and finally the advance indicator 66. As the player selects the "5", "50" and the "2", the bonus meter 38 continuously updates the player's bonus round credits, "5", "55" and "57", respectively. Assuming the player had 50 credits before entering the bonus round, the credit display 20 continuously updates the player's total game credits, "55", "105" and "107", respectively. The bonus meter and credit display remain active throughout the bonus round.

When the player selects the advance indicator 66, the game reveals the "3" and the "25" to the player as unselected award indicators and lost opportunities. The advance indicator 66 directs the player to selection group 58, and the game enables the player to select from that group. The player randomly selects the "2", the 125", the "2", the "150", and finally the advance indicator 66. The advance indicator 66 directs the player to selection group 60, and the game shows the player the unselected "100", "10" and the "4" and enables the player to select from selection group 60. The player randomly selects the "150" and the "3picks" picks indicator. In this example, the unselected indicators remain masked, however, the present invention could alternatively display the remaining unselected picks indicators and awards.

When the player selects the picks indicator 70, the indicator directs the player to the final selection group 62, and the game enables the player to select from that group. The player randomly makes the predetermined three picks "300", "150" and "100", and the game adds the values to the bonus meter and credit display, ending the bonus round 34. The bonus meter 38 and the credit display 20 show the accumulated bonus round credits "1036" and "1086" assuming, as before, that the player had 50 credits before entering the bonus round. In this example, the unselected indicators remain masked, however, the present invention could alternatively reveal the remaining unselected final selection group awards.

Multiple Display Embodiment

Figure 5:
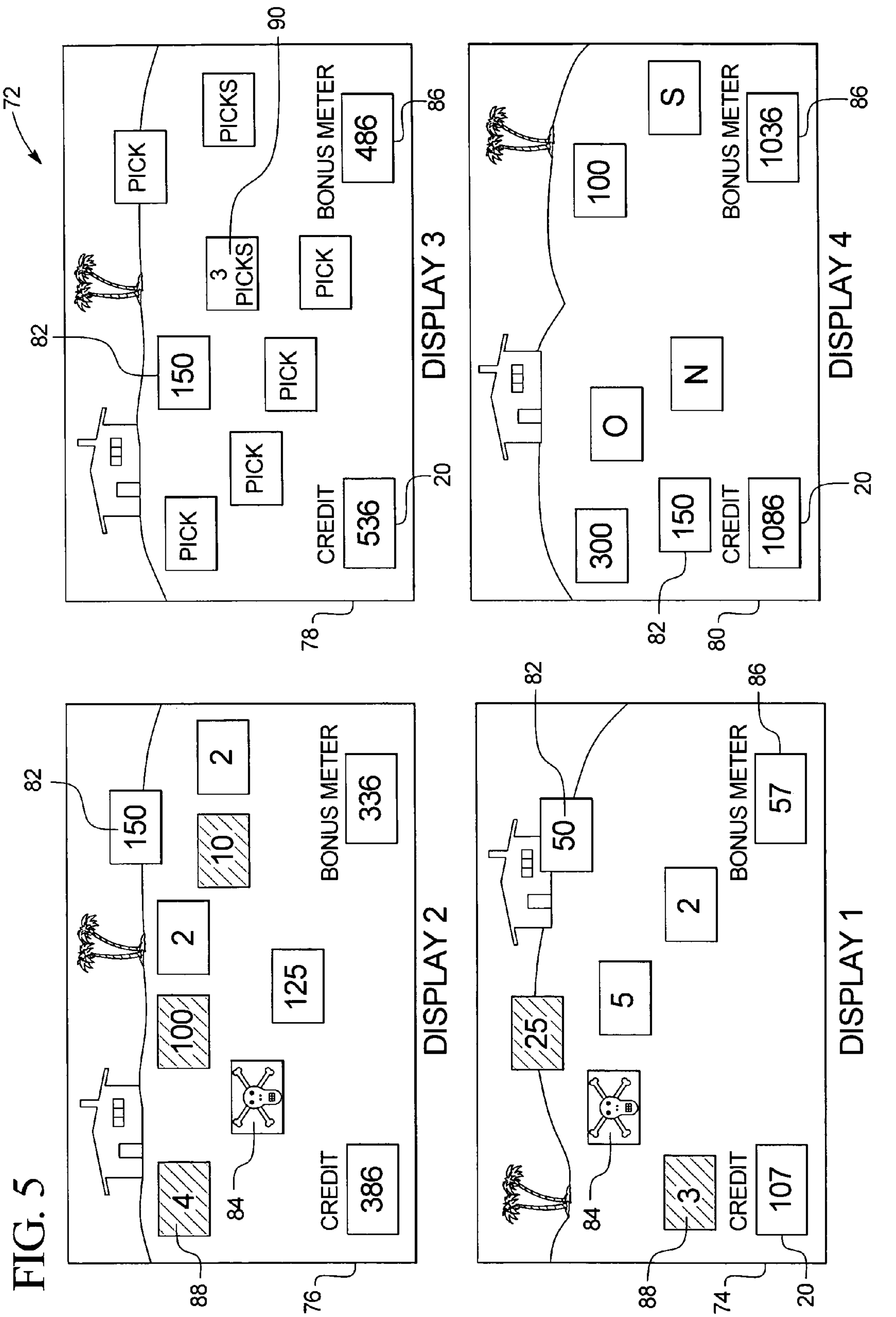
FIG. 5 is an illustration of the sequence of an alternative embodiment of the gaming device having multiple screens, wherein each screen contains a selection group.

FIG. 5 illustrates another embodiment of the bonus scheme 72, which is identical in function to bonus scheme 34 except that it places the selection groups into a plurality of separate displays. In this embodiment, the selection groups are contained in the four separate displays 74, 76, 78 and 80. The video monitor 44 or the touch screen 50 (FIG. 2) shows one display and thus one selection group at a time. Alternatively, any screen could contain more than one selection group. As before, the game enhances player enjoyment during the bonus round by configuring the selection groups according to a predetermined game theme. In this embodiment, the displays 74, 76, 78 and 80 depict spooky graveyard scenes. The game can further enhance game excitement and enjoyment by varying the screens to match the intensity and potential game credit value of the displayed selection group.

In this embodiment, upon a bonus triggering event, the game provides an initial selection group or display 74, which contains a plurality of hidden indicators. If the display 74 contains more than one selection group, the game directs the player to the initial selection group.

The initial displays 74 and 76 contain a plurality of award indicators 82 and at least one advance indicator 84. The player chooses a masked selection from an initial selection group. The game unmasks the selection and shows the player the indicator. If the selection is an advance indicator 84, the player is directed to the next display. If the selection is not an advance indicator 84, then the selection is preferably an award indicator 82. If so, the game displays the value of the award and adds the value to the player's bonus meter 86 and credit display 20 and enables the player to make another selection from the initial selection group 74.

As indicated above, the present invention contemplates using any suitable visible means to direct the player to make another selection from the current selection group. When a single display only contains one selection group, the player will intuitively select from the display until the game changes the display. In such a case, and especially for embodiments where a single display contains multiple selection groups, the game preferably highlights the selection group until the game no longer enables the player to select from that group, at which time the game highlights the next selection group. Alternatively, the game employs a separate "pick again" indicator that lights until the player makes another selection from the current selection group. The invention also contemplates using any suitable audible signals to direct the player to choose from a current selection group or otherwise to choose from another selection group.

After the player moves to the next selection group in another display, the game determines if the display contains a picks indicator 90. If not, then the display preferably contains an advance indicator 84, and the game enables the player to proceed as before. FIG. 5 shows two initial displays 74 and 76, however, the game could provide any number.

Upon reaching the display 78 containing a picks indicator 90, the game enables the player to make a selection from this display. The game unmasks the indicator and shows the player the selection. If the selection is a picks indicator 90, the player is directed to the final selection display 80. If the selection is not a picks indicator, then the selection is preferably an award indicator 82. If so, the game displays the value of the award and adds the value to the player's bonus meter 86 and credit display 20 and enables the player to make another selection from the award display.

Upon selecting the picks indicator 90, the game enables the player to make selections from the final selection display 80. As stated earlier, the picks indicator 90 represents the number of picks that the player will have from the final selection display 80. When the player makes the predetermined number of selections, the game unmasks the award indicators 82 and displays the values to the player. The game adds the values to the player's bonus meter 86 and credit display 20 and ends the bonus round 72 by returning the player to normal game operation.

FIG. 5 also illustrates an example of a player playing a bonus round. The game initializes the bonus round 72 and directs the player to the initial selection group 74. The player randomly selects the "5", the "50", the "2" and finally the advance indicator 84, a skull and cross bones indicating the death of this display. As the player selects the "5", "50" and the "2", the bonus meter 86 continuously updates the player's bonus round credits, "5", "55" and "57", respectively. Assuming the player had 50 credits before entering the bonus round, the credit display 20 continuously updates the player's total game credits, "55", "105" and "107", respectively. The bonus meter and credit display remain active throughout the bonus round.

In the multiple display embodiment, the present invention contemplates the bonus meter 86 operating two ways. In one way, the bonus meter accumulates the bonus credits "57", "336", "486" and "1036" as the player proceeds through the bonus round 72 as shown. In another way, the bonus meter 86 accumulates the bonus credits display by display, so that the game resets the bonus meter when the game changes displays. The bonus meter 86 would display "57", "279", "150" and "550." The present invention could also provide both types of bonus meters.

When the player selects the advance indicator 84 of display 74, the game reveals the "3" and the "25" to the player as unselected indicators and lost opportunities. The game either displays the next display 76, as in this example, or directs the player to another selection group within display 74. In either case, the game enables the player to select from the next selection group. The player randomly selects the "2", the 125", the "2", the "150" and finally the advance indicator 84 of display 76. The game reveals the unselected "100", "10" and the "4" in display 76 and then enables the player to select from display 78. The player randomly selects the "150" and the "3picks" picks indicator 90. In this example, the unselected selections remain masked, however, the present invention could alternatively display the remaining unselected picks indicators and awards.

When the player selects the picks indicator 90, the game advances to the final selection display 80, and the game enables the player to select from that display. The player randomly makes the predetermined three picks "300", "150" and "100", and the game adds the values to the bonus meter and credit display, ending the bonus round 72. The bonus meter 86 and the credit display 20 show the accumulated bonus round credits "1036" and "1086" assuming, as before, that the player had 50 credits before entering the bonus round. The unselected indicators remain masked, however, the present invention could alternatively reveal the remaining unselected final selection group awards.

Alternative Picks Indicator Embodiment

Figure 6:
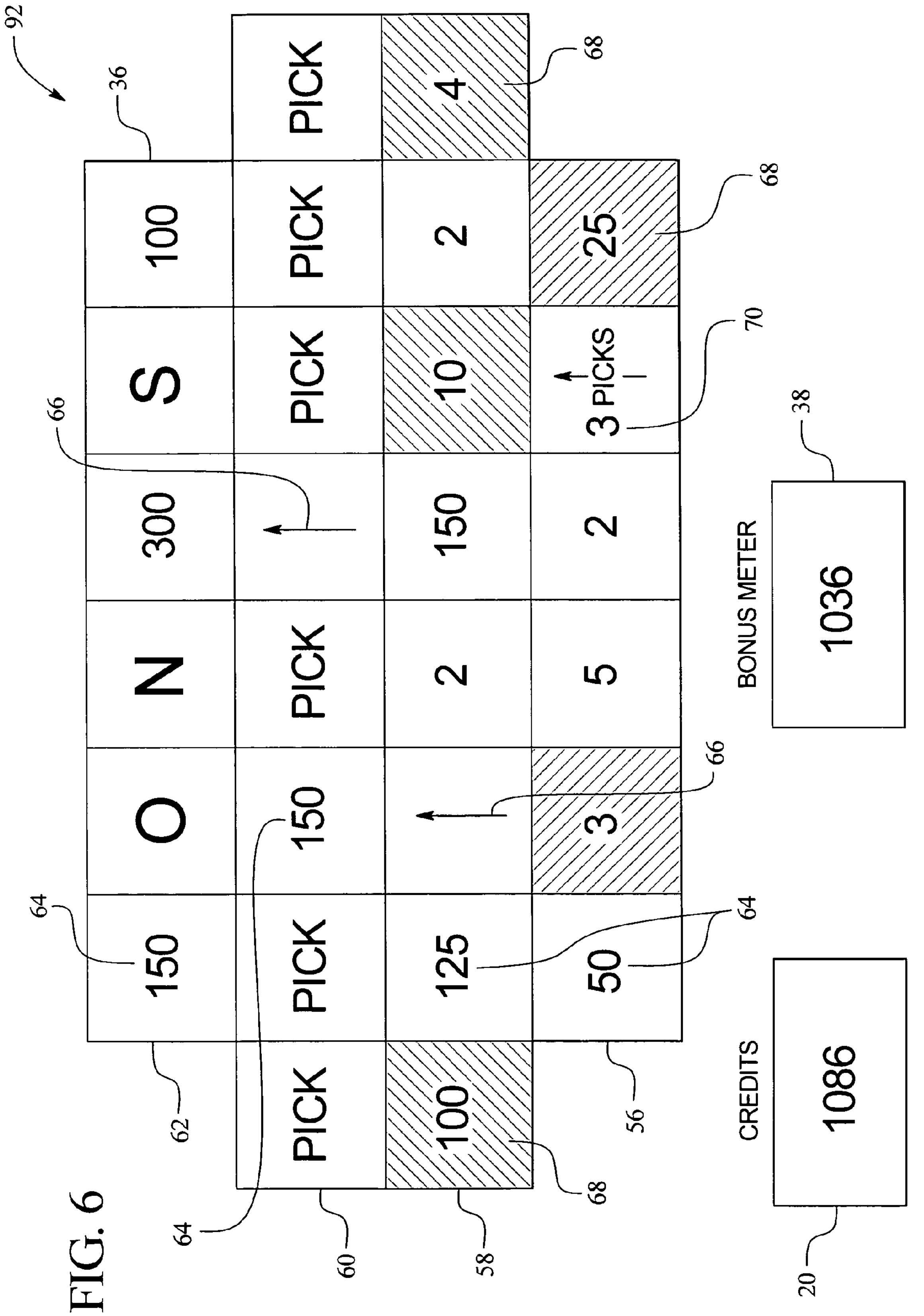
FIG. 6 is a front elevational view of a bonus display of an alternative embodiment of the gaming device, wherein the picks indicator is chosen before the player reaches the next to last selection group.

FIG. 6 illustrates another embodiment of the bonus scheme 92, in which the player selects the picks indicator 70 from a selection group 56 that is not displayed immediately prior to the display of the final selection group 62. For illustration purposes, this embodiment is shown in connection with the single display embodiment 36, however, this embodiment could contain more than one display. In this embodiment the player advances upward through adjacent horizontal selection groups 56, 58, 60 and 62 as before, except now the player learns the number of final selection group picks earlier in the bonus round. It should be appreciated that picks indicator 70 could be also be placed in any initial selection group, such as selection group 58. The bonus meter 20 and credit display 38 operate as described above.

Alternative Multiple Picks Indicator Embodiment

Figure 7:
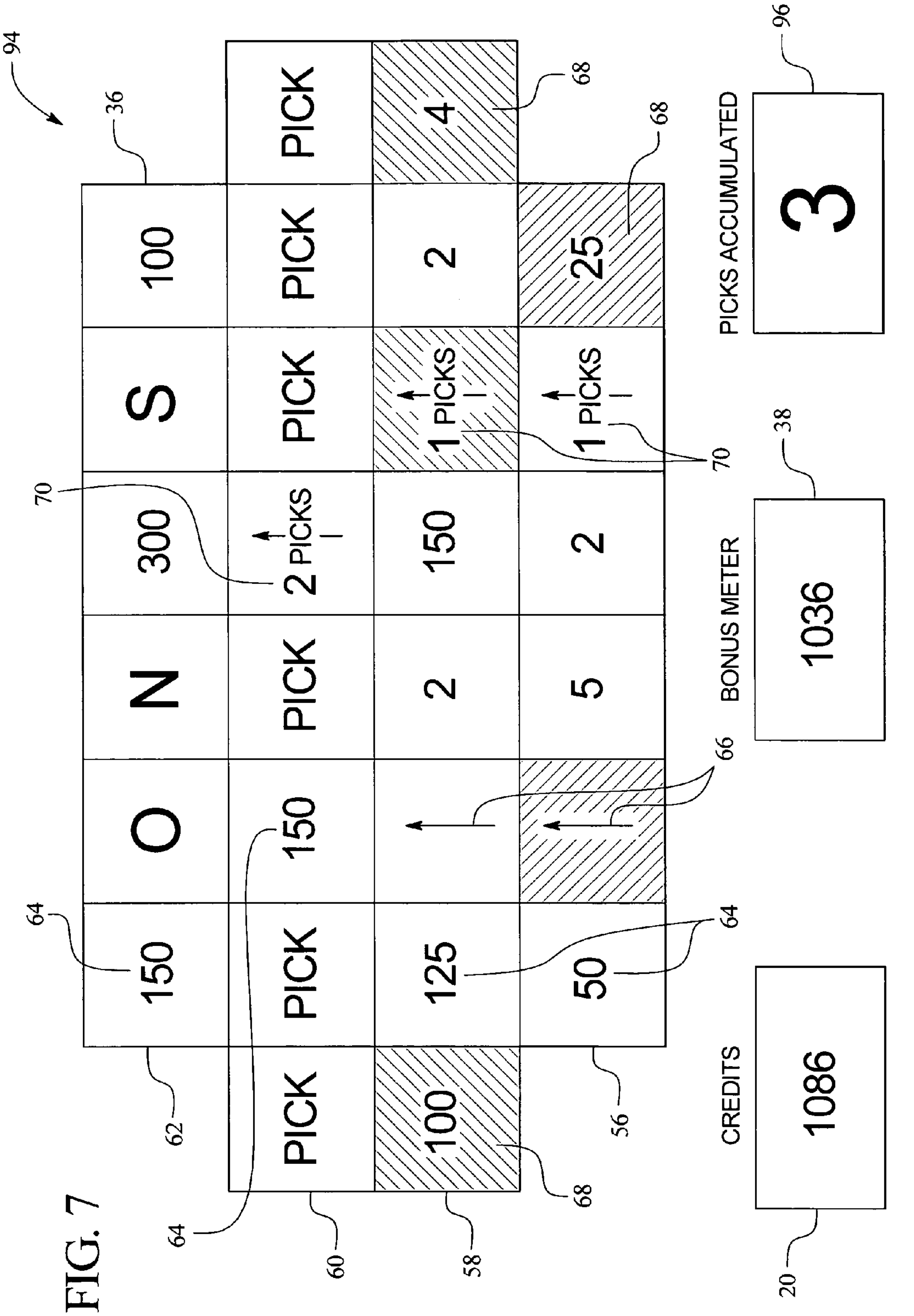
FIG. 7 is a front elevational view of a bonus display of an alternative embodiment of the gaming device, wherein the player can choose picks indicators from more than one selection group.

FIG. 7 illustrates another embodiment of the bonus scheme 94, in which the player selects picks indicators 70 from a plurality of selection groups. In this example, all the selection groups 56, 58 and 60 other than the final selection group 62 contain picks indicators 70. However, not all selection groups would have to contain picks indicators. For illustration purposes, this embodiment is shown in connection with the single display embodiment 36, however, this embodiment could contain more than one display.

The selection groups could contain both picks indicators and advance indicators as shown by selection group 58. It should be appreciated that the player would accumulate credits from the group 58 by choosing award indicators 64 until choosing either the advance indicator 66 or the picks indicator 70. The game accumulates the final selection group picks until the player finally reaches the final selection group. In this example, the player achieved one final selection round pick from the selection group 56, none from the selection group 58, and two from the selection group 60, totaling three. The game could provide a separate "picks meter" 96 to display the player's total number of final selection group picks as the player accumulates them.

Multiple Round Embodiment

Figure 8:
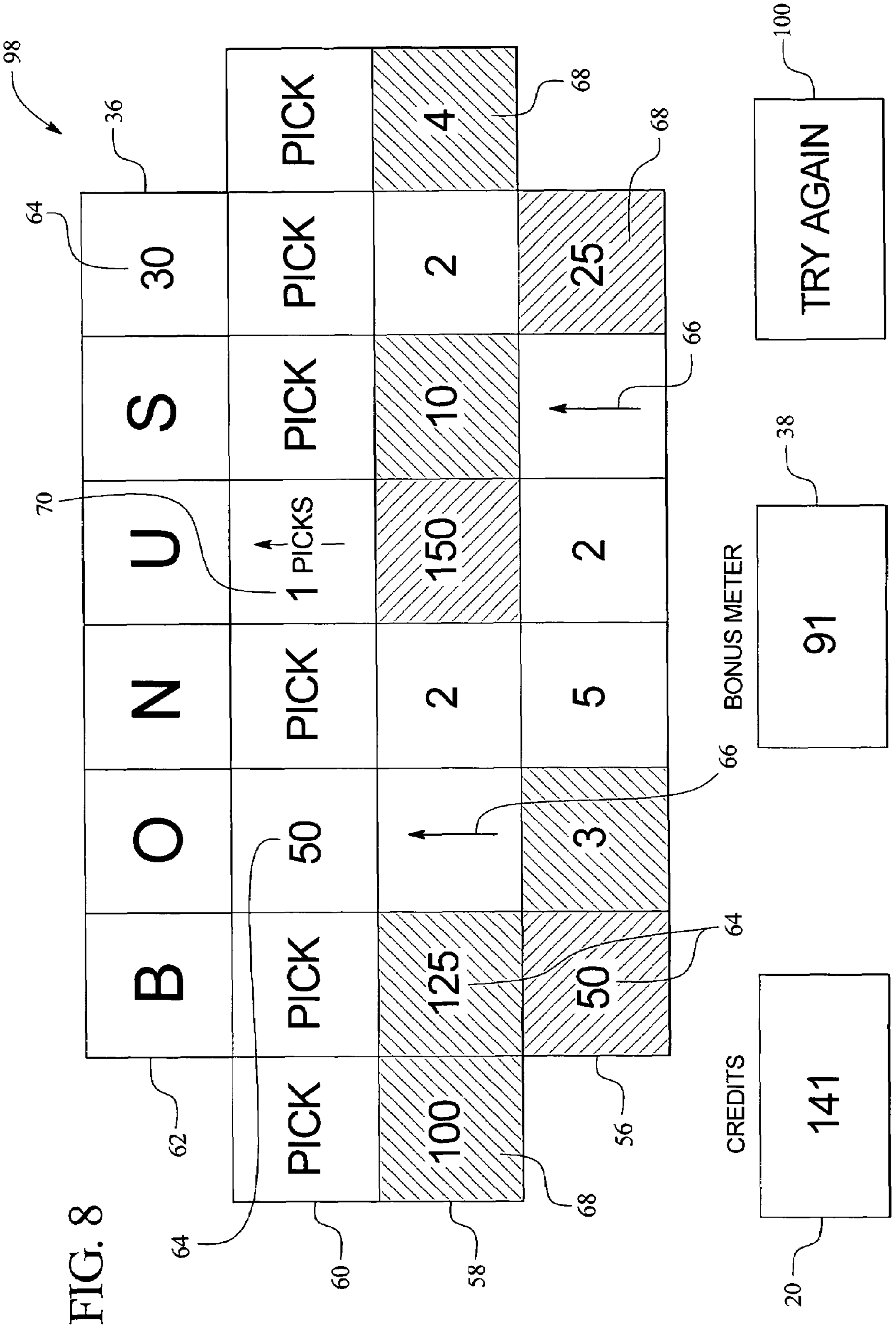
FIG. 8 is a front elevational view of a bonus display of an alternative embodiment of the gaming device, wherein the game enables the player to "try again" upon the occurrence of an event.

FIG. 8 illustrates another embodiment of the bonus scheme 98, in which the game enables the player to "try again" when an event occurs. The implementor can choose any event to trigger the try again feature. For example, the game could enable the player to try again when the round ends after a predetermined number of picks. Another example would be when, at the end of the bonus round, the player's accumulated credits are below a predetermined lower limit. The bonus round does not terminate upon selection from the final selection group when, for example, the player does not accumulate at least one hundred credits as shown in FIG. 8. The game would display a "try again" message 100 or some other suitable means to inform the player that the bonus round is continuing.

Depending upon the triggering event, the game could reset the player's award accumulation to zero before repeating the bonus round. Alternatively, the game could add the award accumulated in the repeated round to the previously accumulated award. Preferably, the player receives a greater award after playing the repeated round. In the examples above, the game would preferably add to the player's previously accrued award when a predetermined number of picks triggers the repeat. In this case, the player may well have accumulated a desirable award and would not want the game to reset the award. Alternatively, when the triggering event is a player's award having a value less than a predetermined threshold, the repeat round ensures the player of obtaining a higher award by resetting the deficient award to zero and starting over until surpassing a threshold level.

This embodiment could enable the player to start over at any point in the bonus round, including the final selection group where the number of picks is known. The controller of the present invention could determine a new set of random positions and values for the selections of the various selection groups. Also, the game could re-mask all the selections and enable the player to choose any selection or, alternatively, only enable the player to choose from unselected selections that are still masked with indicia such as the "pick" indicia of selection group 60 of FIG. 8. The game could enable the player to replay the entire bonus round, only enable the player to select from the final selection group, or to play any portion of the bonus round.

It should also be appreciated that this embodiment could be used in conjunction with the single display embodiment 36, as shown here, or the multiple display embodiment shown in FIG. 5. It should also be appreciated that every embodiment of the present invention ultimately terminates with a final selection group that contains only award indicators or multipliers.

Accept/Reject Embodiment

A further embodiment of the present invention enables the player to accept or reject a pick from the final selection group. The sequence of operation is the same as in FIG. 4, until the player selects the bonus pick indicator as determined in diamond 118. Upon selecting a bonus pick indicator, the game determines whether the player has an accept/reject option. The ways in which a player may obtain an accept/reject option are discussed below. If the player does not have an accept/reject option, the game proceeds as in the earlier embodiment of FIG. 4 as shown in block 120. If the player has an accept/reject option, the game enables the player to make a single bonus group selection and displays the selection.

Next, the game determines whether the player still has an option. If not, the game accepts the pick and adds its value to the player's bonus. If the player does have an option left, the game determines if the player wishes to keep or reject the pick. The game preferably provides a suitable keep or a reject button or has the player press the pick to accept it. The invention contemplates other suitable forms of inputting acceptance, such as providing remote pushbuttons.

If the player decides to reject the pick (i.e., exercises option), the game selects and displays a new value to the player, or alternatively, enables the player to pick another bonus pick from the bonus group. The player proceeds in this manner until the player has no more options or no longer wishes to exercise the change value option, at which point the game accepts the displayed value. If the player has another pick from the final selection group, the game allows the player to make another selection. If not then the game ends the bonus round.

The player may receive any number of accept/reject options in a variety of ways. The present invention contemplates randomly choosing and displaying a number of options. The player can receive the options as the player plays the bonus round (i.e., in the initial selection groups). The game can also randomly prompt the player to accept or reject after certain predetermined selection picks. Alternatively, the player can receive the option during the normal operation of the gaming device.

Number of Picks Embodiment

Figure 9:
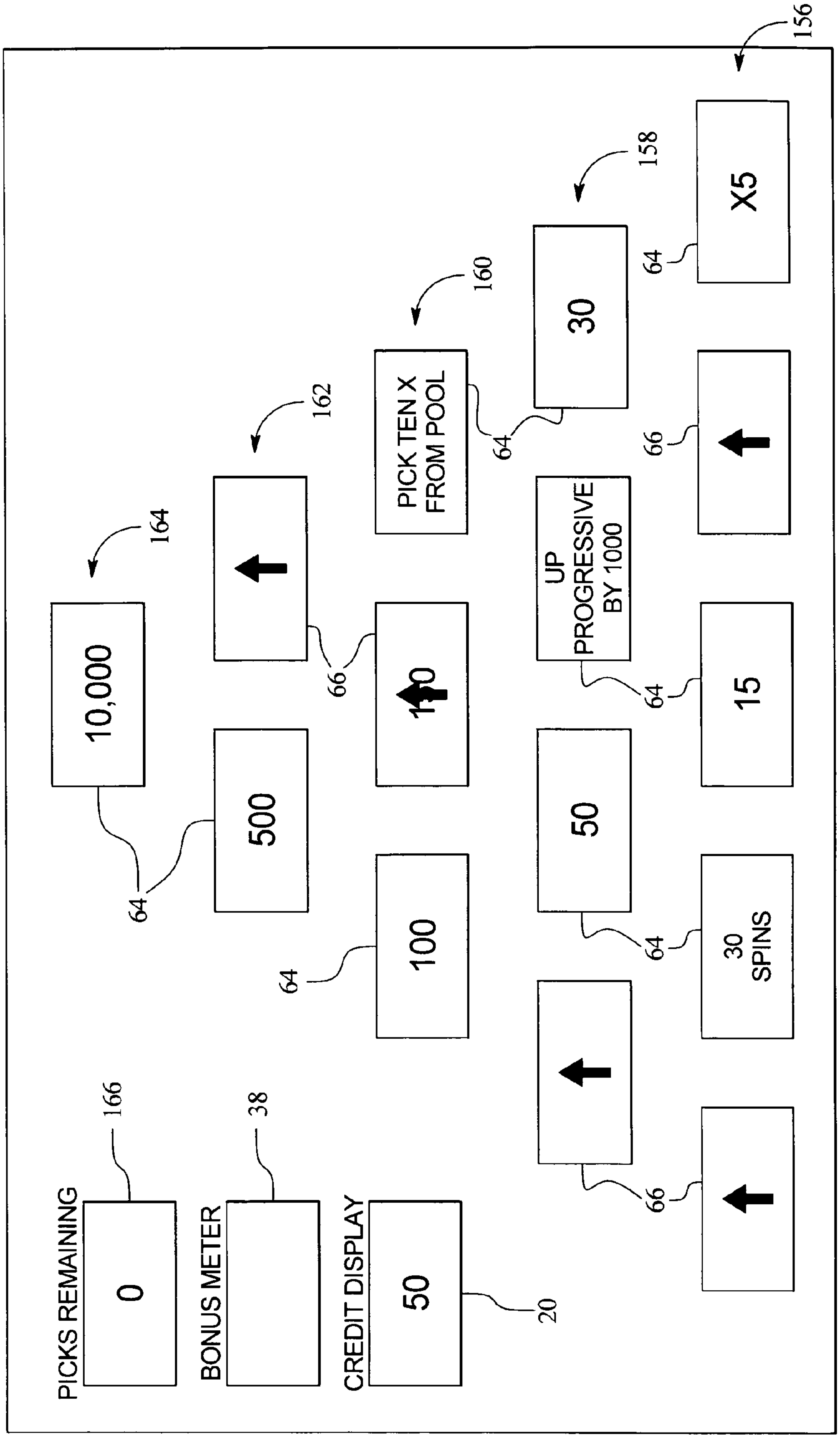
FIG. 9 is a front elevational view of a display of an alternative embodiment of the gaming device, wherein the game provides a number of picks to the player.

Referring now to FIG. 9, one alternative embodiment of the present invention is illustrated, which includes the selection groups 156 to 164 in a single display 136. Alternatively, the selection groups 156 to 164 can be provided in two or more displays as shown above. In the illustrated embodiment, the selection groups are five adjacent horizontally extending rows of selections forming a pyramid shape. The selection groups can have any suitable desired configuration and any suitable number of selections.

The display 136 of FIG. 9 is fully revealed to show the outputs of each of the selections (which are originally masked) of the selection groups 156 to 164. To increase the enjoyment and excitement of the bonus round, gaming device 10 eventually shows the player each of the possible values that the player could have chosen. This revealing could take place at the end of picking from each selection group or at the end of the bonus round. Alternatively, the game could keep the selections masked.

Selection groups 156 to 164 each have a plurality of selections that are masked until a player touches and reveals the output of the selection. Selection group 164 is a final selection group and in the illustrated embodiment has only one selection. In the previous embodiments, which operated with a picks indicator 70, the final selection group included at least two selections, which created a choice for the player in the final set of picks.

In the illustrated embodiment, gaming device 10 provides the player with a total number of picks, shown in and monitored by the picks display 166. The player uses these picks for all of the selections groups, even a selection group that includes only one selection, such as final group 164. The game may determine the number of picks at the beginning of the bonus round, as the bonus round progresses, or at any earlier point in time. The total number of picks may be predetermined or randomly determined. The random determination may take place in another game or subgame. The predetermined number may be related to the player's wager or the player's wager can skew a random determination of a number of picks.

Groups 156 to 164 each include awards 64. The final selection group 164 in one embodiment includes only selections that yield awards, wherein the bonus round ends after the player picks from the final selection group 164. The awards 64 can be any suitable value, such as any suitable amount and combination of gaming device credits, a multiplier of gaming device credits, a number of picks from a prize pool, an incrementing of a progressive game, a number of free games or free spins and any combination of these.

Each succeeding selection group contains awards having, on average, higher values than the preceding selection group. This hierarchy takes into account any of the various types of awards described previously, wherein for example, a progressive game increment in a prior selection group may be deemed to be less valuable than a number of picks from a prize pool provided in a later selection group. The final selection group 164 is preferably the most lucrative group, illustrated here as providing an award of ten thousand. The player therefore desires to reach the final selection group 164 with a pick remaining.

Rows 156, 158, 160 and 162 each include at least one advance indicator 66 that points to another selection group. The pick of a selection that yields an advance indicator 66 signals that the player may no longer select from the current selection group and must move to the next (pointed to) selection group. The embodiment in display 136 employs arrows that direct the player to advance to the selection group directly above the current selection group. As illustrated by the group 160, the advance indicators 66 may additionally award any of the above mentioned types of values or benefits to the player as well as direct the player to the next selection group.

As the player obtains awards 64, the bonus meter or paid display 38 tallies the outcomes of the selections. Additional meters may be added to show a number of picks or free games that are awarded, etc. At the end of the game, the bonus meter 38 will show the player the total credits earned during the bonus round. Additionally, the gaming device 10 updates the credit display 20 to show the player's total credits.

In the illustrated embodiment, gaming device 10 provides the player with a total number of picks that are displayed in the meter 166. The player picks from each selection group 156 to 164 using these picks. The player starts picking with the bottom group 156, works upwards through the groups 158, 160 and 162, respectively, and is required to have at least one pick remaining to reveal the award behind the selection in the final group 164.

In an embodiment, the total number of picks provided is at least enough to reach the final selection group 164. For example, gaming device 10 in the illustrated embodiment can provide five picks to the player, requiring the player to pick only advance indicators 66 in each of the preceding groups 156 to 162 to have a pick left for the final selection group 64. Alternatively, more than five picks could be provided, where, for example, the final selection group could include multiple selections, wherein only one or less than all of the selections yields a large jackpot type of award. Further alternatively, gaming device 10 can be structured such that a selection that yields an advance indicator does not count as one of the player's picks, i.e., does not decrease the tally in the picks remaining indicator 166.

Although the groups 156 to 164 are illustrated as a pyramid, any of the groups could have any number of selections forming any collective shape. Further, the illustrated embodiment could be combined with any other variation of the game described above, such as providing a redo or play again option if the player fails to reach a certain award level or providing accept or reject inputs for one or more of the selection groups 156 to 164. Any one of the selections in the intermediate groups 156 to 162 or the final selection group 164 can also be a picks indicator 70 or, in addition to providing an award 64 or advance 66, provide a number of extra picks that would increment or add back to the picks remaining indicator 166.

In an embodiment that including the picks indicator 70, gaming device 10 yields via one or more of the selections, a number of additional picks to the player, which increments the picks remaining indicator 166. In a further alternative embodiment, gaming device 10 provides a final selection group with awards 64 and a selection group prior to the final selection group with multiple picks indicators 70. Here, gaming device 10 provides the player with just enough picks to reach the second to last selection group with one pick remaining. If the player is lucky and makes it to the second to last group, the player makes one pick from this group, yielding one of the picks indicators 70, which provides the player with a number of picks from the final award selection group.

In one alternative embodiment of the present invention, the awards associated with the selections include one or more free games symbols or free games associated with one or more of the selections in at least one of the groups (instead of or in addition to, for instance, the credit values associated with selection). In one such alternative embodiment, one or more multipliers or incrementors are associated with the selections in at least one of the groups. If the player obtains a plurality of free spins and a multiplier in one selection group, that multiplier applies in the free games obtained by the player in that selection group. Thus, any awards obtained in those free games are multiplied by the multiplier associated with those free games.

In one such embodiment, as the player picks the selections, the player gets either credits, a number of free games, a multiplier or an advance indicator. In another embodiment, the games does not include credits associated with the selection; rather, only free games of the primary game are awarded to the player. In a further alternative embodiment, the multiplier is incremented for each pick of each selection having an associated multiplier and accumulated for subsequent use. The accumulated multiplier applies to the various awards such as the free spins obtained by picking selections in that game. In a further alternative embodiment, a number of free spins are associated with each of the selections in a group (except for the advance indicator selection or alternatively including the advance indicator) and multipliers are associated with the selections in another group (except for the advance indicator selection or alternatively including the advance indicator selection). In this embodiment, the multipliers and the free spins are thus obtained and accumulated in different groups until the advance indicator is obtained in that respective group.

It should be appreciated that the free spins of reels could take other forms such as free activations of a video poker, blackjack, keno or other primary game.

Award Generator Embodiment

Figure 10A:
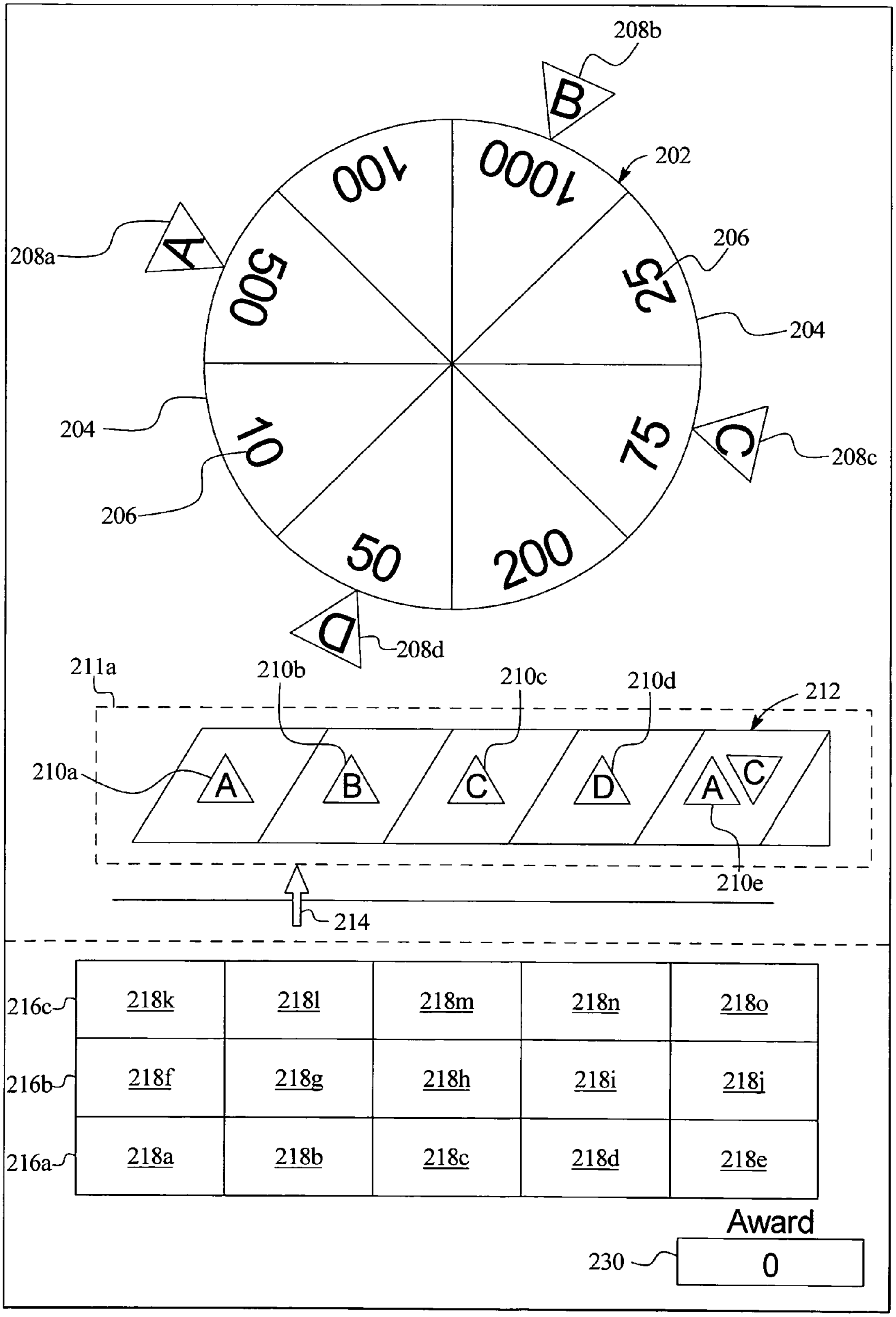
FIGS. 10A, 10B, 10C, 10D, 10E, 10F, 10G and 10H are front elevational views of an alternative embodiment of the gaming device of the present invention, wherein each of the plurality of activator symbols is associated with a number of section indicators of an award generator.

Referring to FIG. 10A, in another embodiment of the present invention, the gaming device provides at least one award generator 202. In this embodiment, the gaming device includes at least one electromechanical award generator, such as a rotatable wheel, reel, die which is attached to the housing of the gaming device. In one embodiment, the award generator is a rotatable wheel including a plurality of sections 204. In this embodiment, each section displays an award 206 or an award symbol which is associated with one or more awards. The awards may be values, prizes, modifiers or multipliers, free spins, free games, game elements or any other suitable type of award or outcome. In one embodiment (not shown), the mechanical award generator is associated with and connected to a suitable actuator or motor which is controlled by the processor. For example, if the award generator is a wheel, the associated actuator or motor is adapted to drive or rotate the rotatable wheel in a clockwise or counter-clockwise direction. In another embodiment, the award generator is in a suitable video format which is displayed via one or more display devices. In an alternative embodiment, any suitable electromechanical device which moves one or more interacting objects, such as one or more reels or dice, which are configured to display at least one and preferably a plurality of games or other suitable images, symbols or indicia may be employed as the award generator in the present invention.

In one embodiment, the award generator includes at least one and preferably a plurality of activatable section indicators. Each section indicator is adapted to indicate at least one of the sections of the award generator. In different embodiments, the number of activatable section indicators is predetermined, randomly determined, determined based on the player's wager in a primary game, determined from the occurrence of one or more symbols in a primary game or determined based on any other suitable method. For example, as illustrated in FIG. 10A, the award generator includes four activatable section indicators 208*a*, 208*b*, 208*c* and 208*d* designated by the letters A, B, C and D, respectively.

In one embodiment, each of the awards adapted to be generated by the award generator is selected from one or more pools of awards. In another embodiment, each of the awards is selected from one or more ranges of awards. In another embodiment, each of the awards is associated with a probability and each of the awards is selected based on the associated probabilities. In different embodiments, the awards are predetermined, randomly determined, determined based on the player's wager in a primary game, determined from the occurrence of one or more symbols in a primary game or determined based on any other suitable method.

As illustrated in FIG. 10A, in one embodiment, in addition to the award generator, the gaming device provides a plurality of activator symbol sets or levels 211. Each activator symbol set or level includes a plurality of activator symbols. In this example, the gaming device displays a first activator symbol set 211*a* which includes activator symbols 210*a*, 210*b*, 210*c*, 210*d* and 210*e* designated by the letters A, B, C, D and AC, respectively. In this embodiment, each activator symbol is associated with one or more of the activatable selection indicators described above. That is, activator symbol 210*a* which is designated as the letter A is associated with section indicator 208*a* also designated as the letter A, activator symbol 210*b* which is designated as the letter B is associated with section indicator 208*b* also designated as the letter B, activator symbol 210*c* which is designated as the letter C is associated with section indicator 208*c* also designated as the letter C, activator symbol 210*d* which is designated as the letter D is associated with section indicator 208*d* also designated as the letter D and activator symbol 210*e* which is designated as the letters A and C is associated with section indicators 208*a* and 208*c* also designated as the letters A and C.

In one embodiment, one or more of the different sets or levels of activator symbols correspond, on average, with a different average award or payout provided to the player than another set of activator symbols. That is, as the player advances from one set of activator symbols to another set of activator symbols, the different sets of activator symbols have different average total awards or total payouts which will ultimately be provided to the player. For example, if the activator symbols in a first level of activator symbols average two active section indicators of the award generator and the activator symbols in a second level of activator symbols average three active section indicators of the award generator, then the second level of activator symbols is associated with a higher average award or payout than the first level of activator symbols. In this example, as the number of active section indicators relates to the number of awards provided to the player (i.e., each active section indicator provides the player one award) and the greater the number of awards provided to the player, the greater the average total award or total payout, the second level of activator symbols will provide the player more awards and thus a greater average total award or total payout than the first level of activator symbols. In another embodiment, one or more of the different sets or levels of activator symbols correspond, on average, with the same average award provided to the player as one or more other sets of activator symbols.

In this embodiment, as activator symbol 210*e* is associated with two section indicators, activator symbol 210*e* has a higher average payout than any of the other activator symbols in this first set of activator symbols. That is, if activator symbol 210*e* is selected, then two section indicators will be activated for at least one activation of the award generator and these two section indicators will indicate two awards of the award generator. On the other hand, if an activator symbol associated with one section indicator is selected, then one section indicator will be activated for at least one activation of the award generator to indicate one award. Accordingly, if selected from the same set of awards, two indicated awards will have a higher average payout than one indicated award and thus activator symbol 210*e* has a higher average payout than any of the other activator symbols in this first set of activator symbols.

As illustrated in FIG. 10A, in one embodiment, the set of activator symbols is displayed to the player utilizing an activator symbol indicator device 212. In this embodiment, the activator symbol indicator device includes a translating indicator 214 which is adapted to designate or indicate one of the activator symbols. In one embodiment, the activator symbol indicating device may be the device disclosed in U.S. Pat. No. 6,712,694 or any other suitable device. For example, each different activator symbol set is displayed on a different side, level or display of the activator symbol indicating device. It should be appreciated that any suitable video or electromechanical device may be employed to display the activator symbol sets of the present invention.

As illustrated in FIG. 10A, in one embodiment, the gaming device provides a plurality of selection groups, levels or sets including one or more non-final selection groups 216*a* and 216*b* and a final selection group 216*c*. The selection groups may be displayed on the same display or a separate display as the award generator and the plurality of sets of activator symbols.

As described below, each selection group or level is associated with one set or level of activator symbols. Each selection group includes a plurality of selections 218. In this example, non-final selection group 216*a* includes selections 218*a*, 218*b*, 218*c*, 218*d* and 218*e*, non-final selection group 216*b* includes selections 218*f*, 218*g*, 218*h*, 218*i* and 218*j*; and final selection group 216*c* includes selections 218*k*, 218*l*, 218*m*, 218*n* and 218*o*. Each selection is either associated with an advance indicator or an initiator, such as an activator symbol selection initiator, however, the gaming device does not initially display whether each selection is associated with an advance indicator or an initiator. As described below, each advance indicator advances the player to pick from a different, subsequent selection group and each initiator causes the selection of one of the activator symbols. In the embodiment illustrated in FIG. 10A, each selection in each non-final selection group is associated with either an advance indicator or an initiator and each selection in the final selection group is associated with an initiator. In another embodiment, one or more of the selections may be associated with one or more awards. The awards may be values, prizes, modifiers or multipliers, free spins, free games, game elements or any other suitable type of award or outcome.

In one embodiment, at least one selection in at least one non-final selection group is associated with an advance indicator. In another embodiment, at least one selection in a plurality of non-final selection groups is associated with an advance indicator. In another embodiment, at least one selection in each non-final selection group is associated with an advance indicator.

In one embodiment, a plurality of selections in at least one non-final selection group are associated with advance indicators. In another embodiment, a plurality of selections in a plurality of non-final selection groups are associated with advance indicators. In another embodiment, a plurality of selections in each non-final selection group are associated with advance indicators.

In one embodiment, each selection in at least one non-final selection group is associated with an advance indicator. In another embodiment, each selection in a plurality of non-final selection groups is associated with an advance indicator. In another embodiment, each selection in each non-final selection groups is associated with an advance indicator. In different embodiments, the number of advance indicators associated with selections in the different selection groups is predetermined, randomly determined, determined based on the player's wager in a primary game, determined from the occurrence of one or more symbols in a primary game or determined based on any other suitable method.

In one embodiment, at least one selection in at least one non-final selection group is associated with an initiator. In another embodiment, at least one selection in a plurality of non-final selection groups is associated with an initiator. In another embodiment, at least one selection in each non-final selection group is associated with an initiator.

In one embodiment, a plurality of selections in at least one non-final selection group are associated with initiators. In another embodiment, a plurality of selections in a plurality of non-final selection groups are associated with initiators. In another embodiment, a plurality of selections in each non-final selection group are associated with initiators. In different embodiment, the number of initiators associated with selections in the different selection groups is predetermined, randomly determined, determined based on the player's wager in a primary game, determined from the occurrence of one or more symbols in a primary game or determined based on any other suitable method.

In one embodiment, the ratio of initiators to advance indicators associated with the selections in a selection group increases from a first selection group to a later selection group. For example, a first selection group may have four advance indicators and one initiator associated with the plurality of selections in that selection group while a later selection group may have one advance indicator and four initiators associated with the plurality of selections in that selection group. In this embodiment, as the player advances from one selection group to the next selection group, the probability increases that the player will select an initiator with their next pick. In another embodiment, the ratio of initiators to advance indicators associated with the selections in a selection group decreases from a first selection group to a later selection group. In another embodiment, the ratio of initiators to advance indicators associated with the selections in a selection group remains the same from a first selection group to a later selection group.

In one embodiment, each selection group is associated with one of the activator symbol sets. For example, a first selection group 216*a* is associated with a first activator symbol set 211*a*, a second selection group 216*b* is associated with a second activator symbol set 211*b* (not shown) and a third selection group 216*c* is associated with a third activator symbol set 211*c* (not shown). In another embodiment, at least one selection group is associated with a plurality of activator symbol sets. For example, a first selection group is associated with a first activator symbol set while a second selection group and a third selection group are each associated with a second activator symbol set. In another embodiment, a plurality of selection groups are each associated with a plurality of activator symbol sets. In another embodiment, each selection group is associated with a plurality of activator symbol sets. In different embodiment, the number of selection groups associated with each activator symbol set is predetermined, randomly determined, determined based on the player's wager in a primary game, determined from the occurrence of one or more symbols in a primary game or determined based on any other suitable method.

In operation, upon a suitable triggering event, the gaming device enables the player to pick one selection from one of the selection groups. The gaming device reveals the advance indicator or initiator associated with the picked selection. If an initiator is revealed, the gaming device proceeds to the activator symbol selection and/or award selection phase of the game as described below.

If an advance indicator is revealed, the gaming device advances to the next or subsequent selection group and may modify the displayed set of activator symbols depending on the next selection group. That is, if an advance indicator is revealed to be associated with the player picked selection, the gaming device determines if the next or subsequent group of selections is associated with the same or a different set of activator symbols. If the next group of selections is associated with the same displayed set of activator symbols, the gaming device continues displaying the set of activator symbols associated with the next selection group (i.e., which is the same set of activator symbols associated with the previous selection group). If the next group of selections is associated with a different set of activator symbols, the gaming device displays the set of activator symbols associated with the next selection group. In one embodiment wherein each set of activator symbols is associated on a different side of an activator symbol indicating device, the gaming device will partially rotate the activator symbol indicating device to reveal the next set of activator symbols associated with the next group of selections.

Figure 10B:
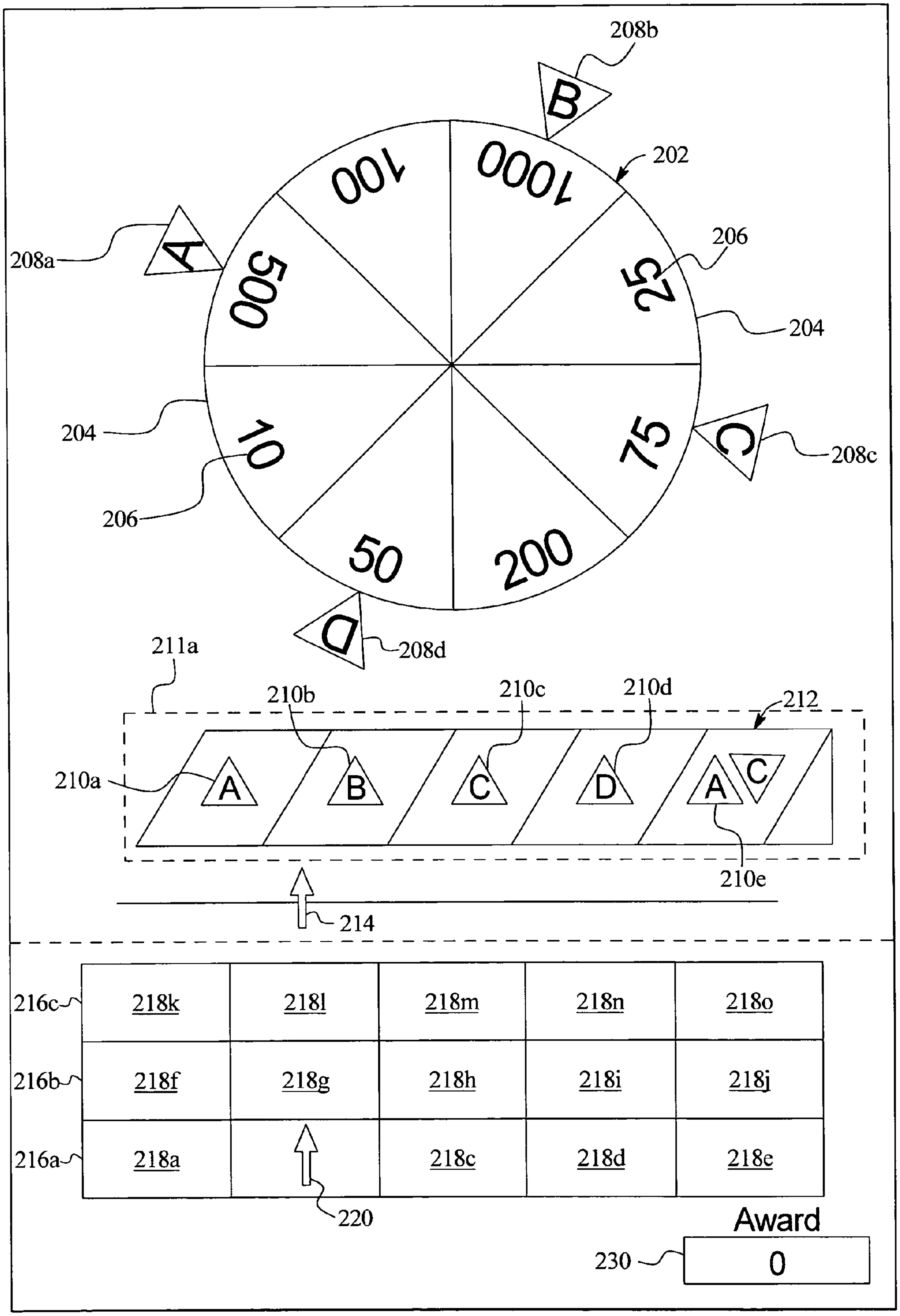

In this example, as illustrated in FIG. 10B, the gaming device enabled the player to pick one selection from the first non-final selection group 216*a*. The player picked selection 218*b* which the gaming device revealed to be associated with an advance indicator 220. Accordingly, the gaming device advances the player to the next or subsequent selection group 216*b*. Additionally, the subsequent selection group 216*b* is associated with a different, second set of activator symbols 211*b* and accordingly, the gaming device displays the second set of activator symbols associated with selection group 216*b*, as illustrated in FIG. 10C.

Figure 10C:
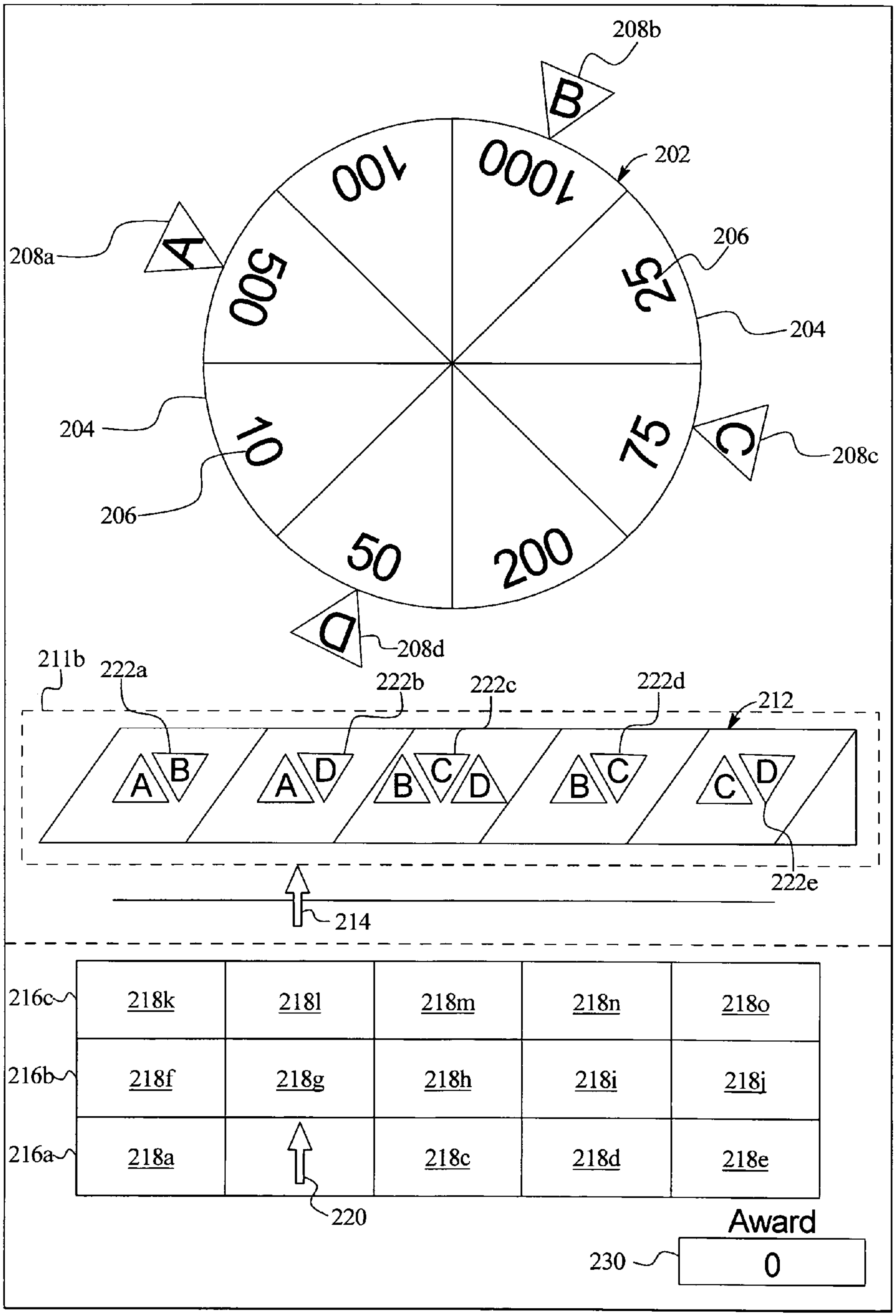

As seen in FIG. 10C, the second set of activator symbols includes activator symbol 222*a* which is designated as the letters A and B and is associated with section indicator 208*a* and 208*b* also designated as the letters A and B; activator symbol 222*b* which is designated as the letters A and D and is associated with section indicator 208*a* and 208*d* also designated as the letters A and D; activator symbol 222*c* which is designated as the letters B, C and D and is associated with section indicator 208*b*, 208*c* and 208*d* also designated as the letters B, C and D; activator symbol 222*d* which is designated as the letters B and C and is associated with section indicator 208*b* and 208*c* also designated as the letters B and C and activator symbol 222*e* which is designated as the letters C and D and is associated with section indicator 208*c* and 208*d* also designated as the letters C and D. It should be appreciated that as the activator symbols in the second set of activator symbols are each associated with at least two section indicators of the award generator, as described above, the activator symbols in the second set of activator symbols have, on average, a higher payout than the first set of activator symbols.

After revealing the set of activator symbols associated with the next group of selections, the gaming device enables the player to pick one of the selections from the next group of selections. The gaming device reveals the advance indicator or initiator associated with the picked selection and if an advance indicator is revealed, determines if the next or subsequent group of selections is associated with the same or a different set of activator symbols as described above.

Figure 10D:
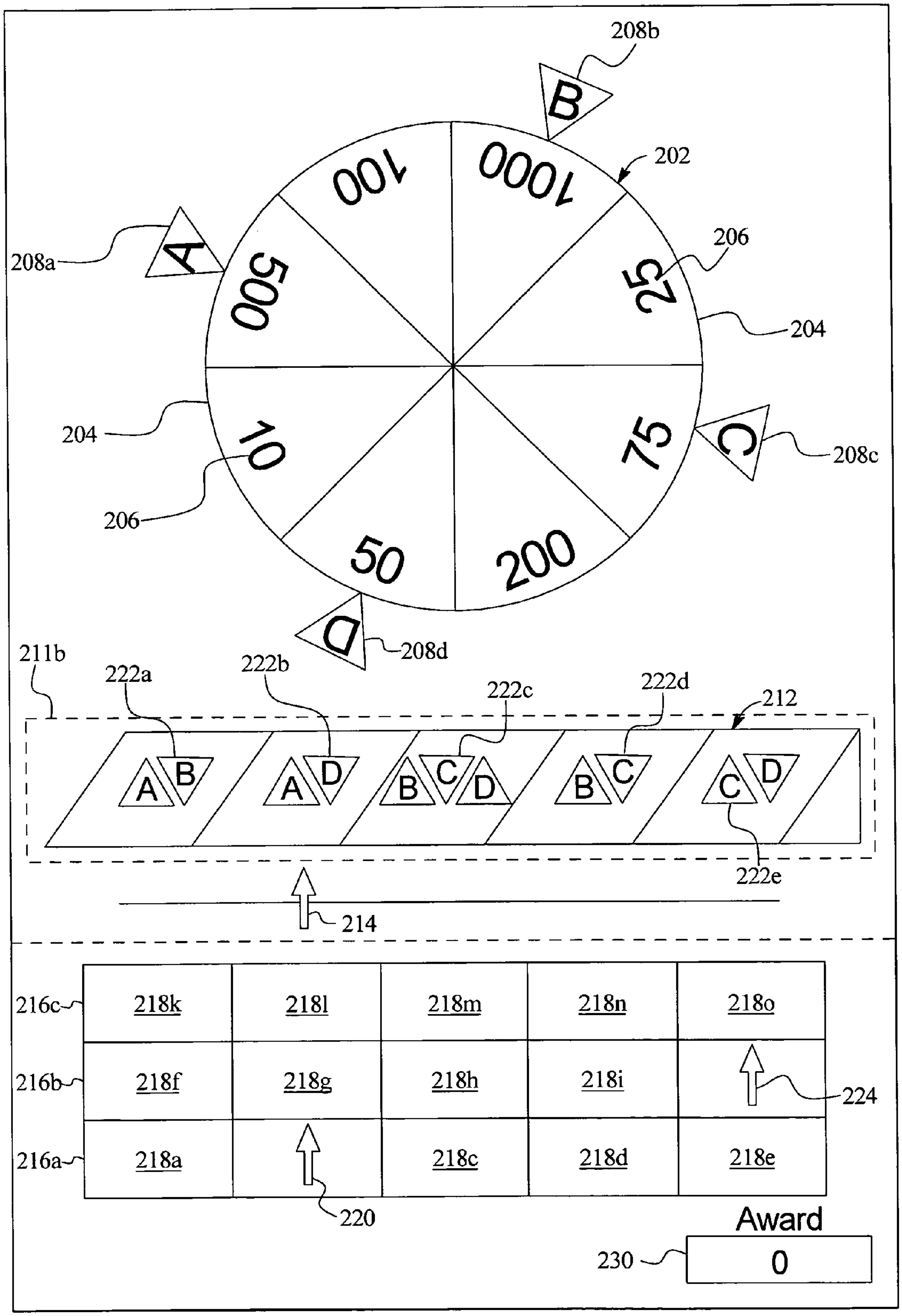

In this example, as illustrated in FIG. 10D, the player picked selection 218*j* which the gaming device revealed to be associated with an advance indicator 224. Accordingly, the gaming device advances the player to the next or subsequent selection group 216*c*. In this embodiment, selection group 216*c* is a final selection group and thus each selection in selection group 216*c* is an initiator. The subsequent selection group 216*c* is associated with a different, third set of activator symbols and accordingly, the gaming device displays the third set of activator symbols 211*c* associated with selection group 216*c*, as illustrated in FIG. 10E.

Figure 10E:
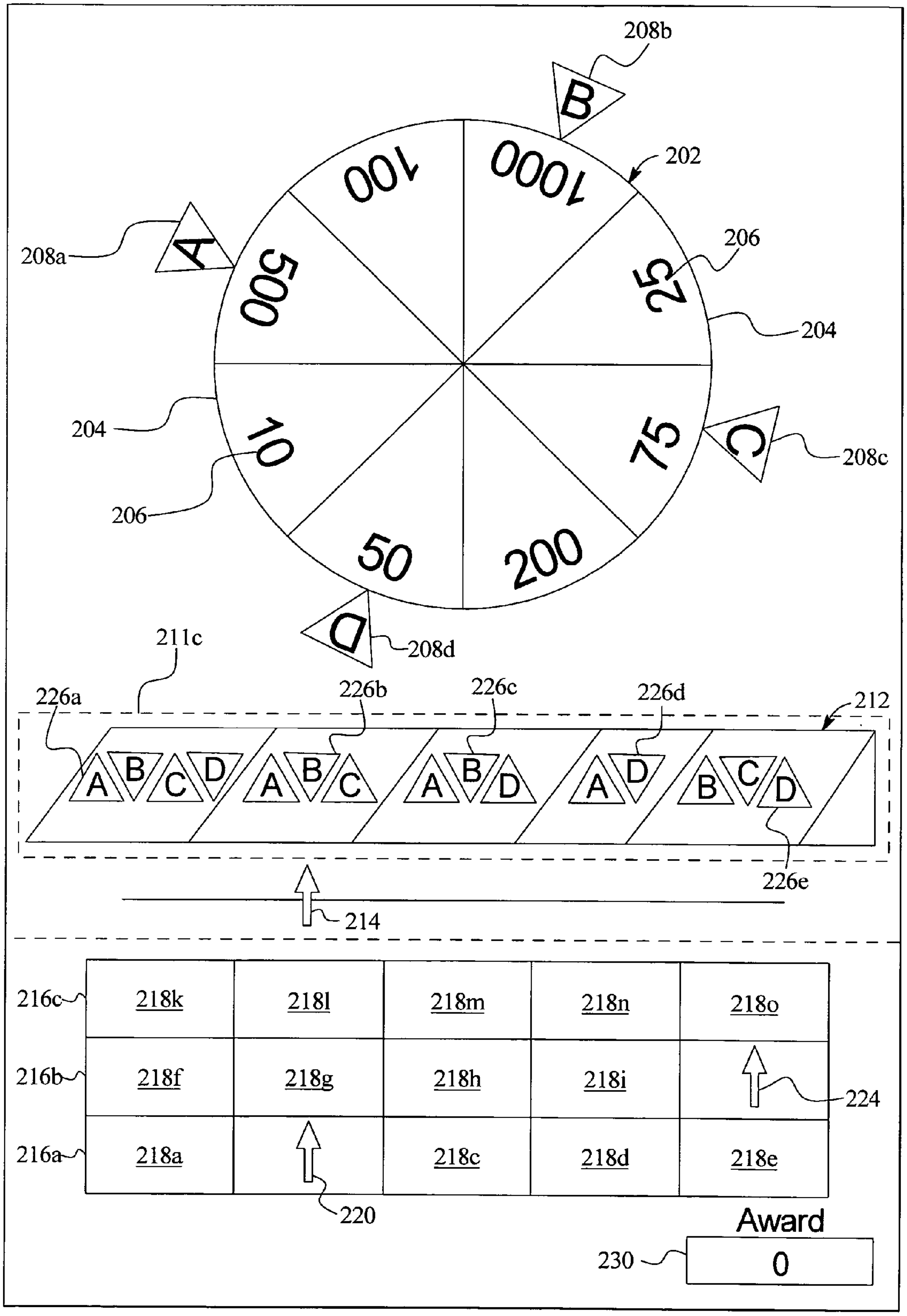

As seen in FIG. 10E, the third set of activator symbols includes activator symbol 226*a* which is designated as the letters A, B, C and D and is associated with section indicator 208*a*, 208*b*, 208*c* and 208*d* also designated as the letters A, B, C and D; activator symbol 226*b* which is designated as the letters A, B and C and is associated with section indicator 208*a*, 208*b* and 208*c* also designated as the letters A, B and C; activator symbol 226*c* which is designated as the letters A, B and D and is associated with section indicator 208*a*, 208*b* and 208D also designated as the letters A, B and D; activator symbol 226*d* which is designated as the letters A and D and is associated with section indicator 208*a* and 208*d* also designated as the letters A and D and activator symbol 226*e* which is designated as the letters B, C and D and is associated with section indicator 208*b*, 208*c* and 208*d* also designated as the letters B, C and D. It should be appreciated that as the activator symbols in the third set of activator symbols are on average associated three section indicators of the award generator, as described above, the activator symbols of the third set of activator symbols have, on average, a higher payout than the first set of activator symbols or the second set of activator symbols.

Figure 10F:
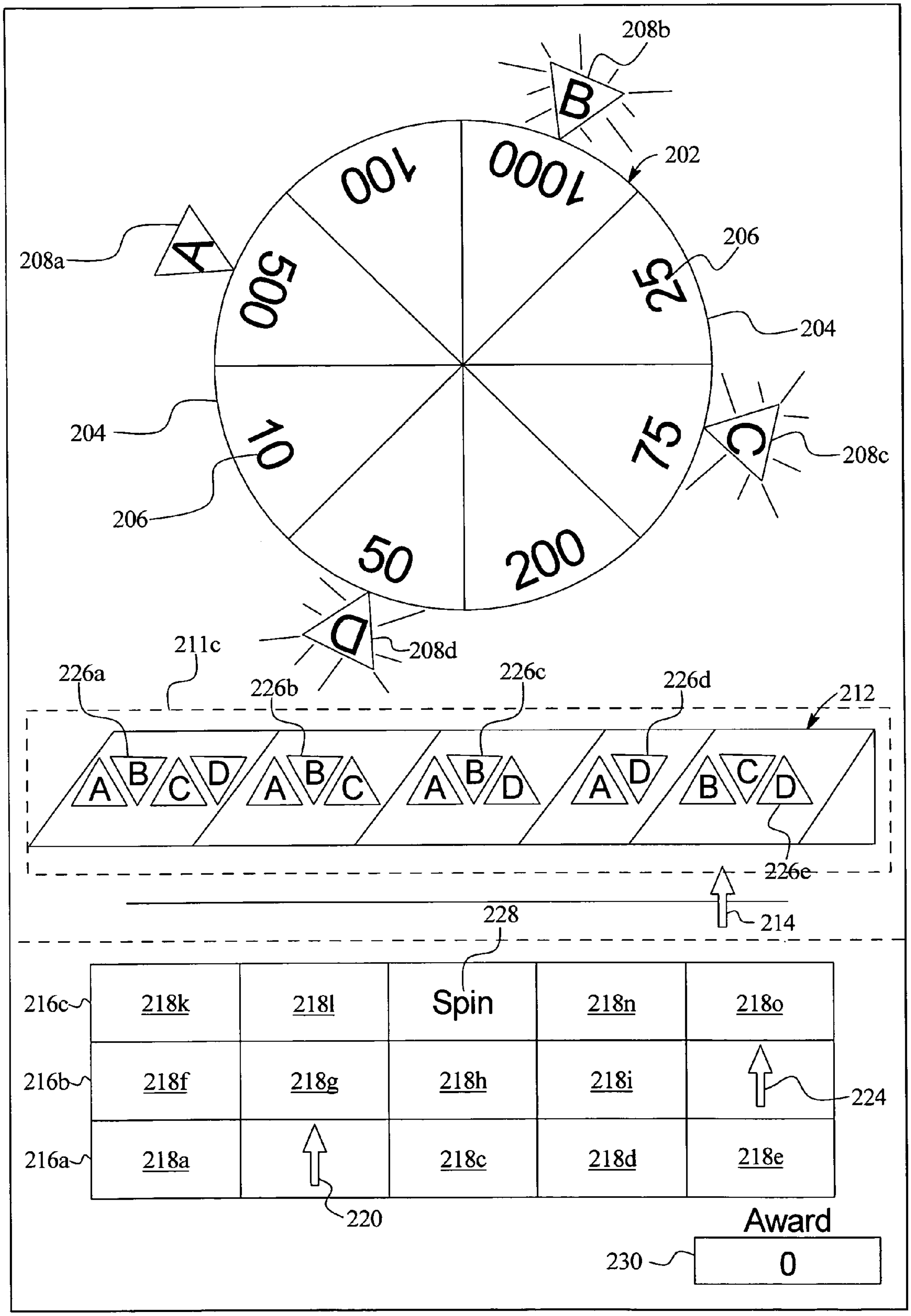

As described above, after revealing the set of activator symbols associated with the next group of selections, the gaming device enables the player to pick one of the selections from the next group of selections as described above. As illustrated in FIG. 10F, the player picked selection 218*m* which the gaming device revealed to be associated with an initiator 228. The selection of an initiator causes the termination of the player selection phase of the game and advances the player to the award generation phase of the game.

After an initiator is revealed (i.e., in the award generation phase of the game), the gaming device indicates one of the activator symbols from the activator symbol set associated with the group of selections including the revealed initiator. In this example, as the player picked selection in the third selection group 216*c* revealed an activator indicator symbol, the gaming device selects or indicates one of the activator symbols from the third set of activator symbols which is associated with the third selection group.

As illustrated in FIG. 10F, the gaming device selected or indicated activator symbol 226*e* which is designated as the letters B, C and D and is associated with section indicator 208*b*, 208*c* and 208*d* also designated as the letters B, C and D. In one embodiment, the gaming device utilizes a translating indicator 214 to indicate the selected activator symbol, however, it should be appreciated that any suitable method of selecting or indicating an activator symbol from the appropriate set of activator symbols may be employed with the present invention.

Figure 10G:
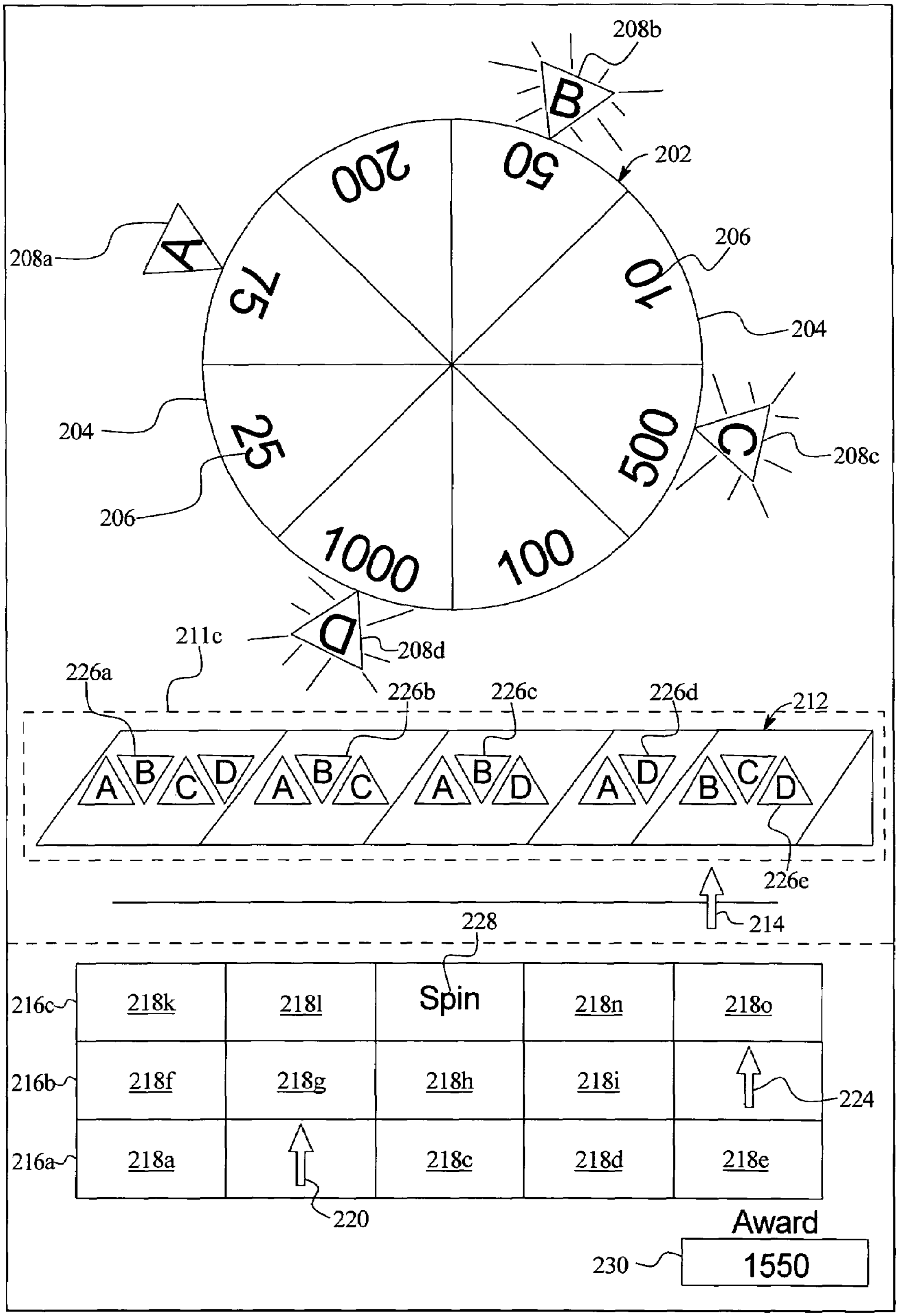

As illustrated in FIG. 10G, the section indicator(s) associated with the indicated activator symbol are activated for one or more spins or generations of the award generator. In this case, as indicated activator symbol 226 is associated with section indicator 208*b*, 208*c* and 208*d*, the gaming device activates section indicators 208*b*, 208*c* and 208*d* for one or more activations of the award generator.

In one embodiment, the section indicator(s) associated with the indicated activator symbol are activated for one activation of the award generator. In another embodiment, the section indicator(s) associated with the indicated activator symbol are activated for a plurality of activations of the award generator. In other embodiments, the number of activations the section indicator(s) associated with the indicated activator symbol are activated for is predetermined, randomly determined, determined based on the player's wager, determined based on the symbol combination that activated triggered the secondary game or determined in any other suitable fashion.

As seen in FIG. 10G, after at least one section indicator is activated based on the indicated activator symbol, the gaming device activates the award generator to spin one or more times. The number of times the award generator is activated may be predetermined, randomly determined, determined based on the player's wager or determined in any other suitable fashion. For each activation of the award generator, the award indicated by each activated section indicator is provided to the player. In this case, the award generator is activated one time and activated indicator 208*b* indicates an award of fifty, activated indicator 208*c* indicates an award of five-hundred and activated indicator 208*d* indicates an award of one-thousand. A total award is determined based on each of the indicated awards and displayed to the player in a total award display 230. The total award of one-thousand-five-hundred-fifty (the sum of the three indicated awards) is provided to the player and the game ends. Appropriate messages such as "GAME OVER" and "YOUR AWARD IS 1550" may be provided to the player visually, or through suitable audio or audiovisual displays.

Figure 10H:
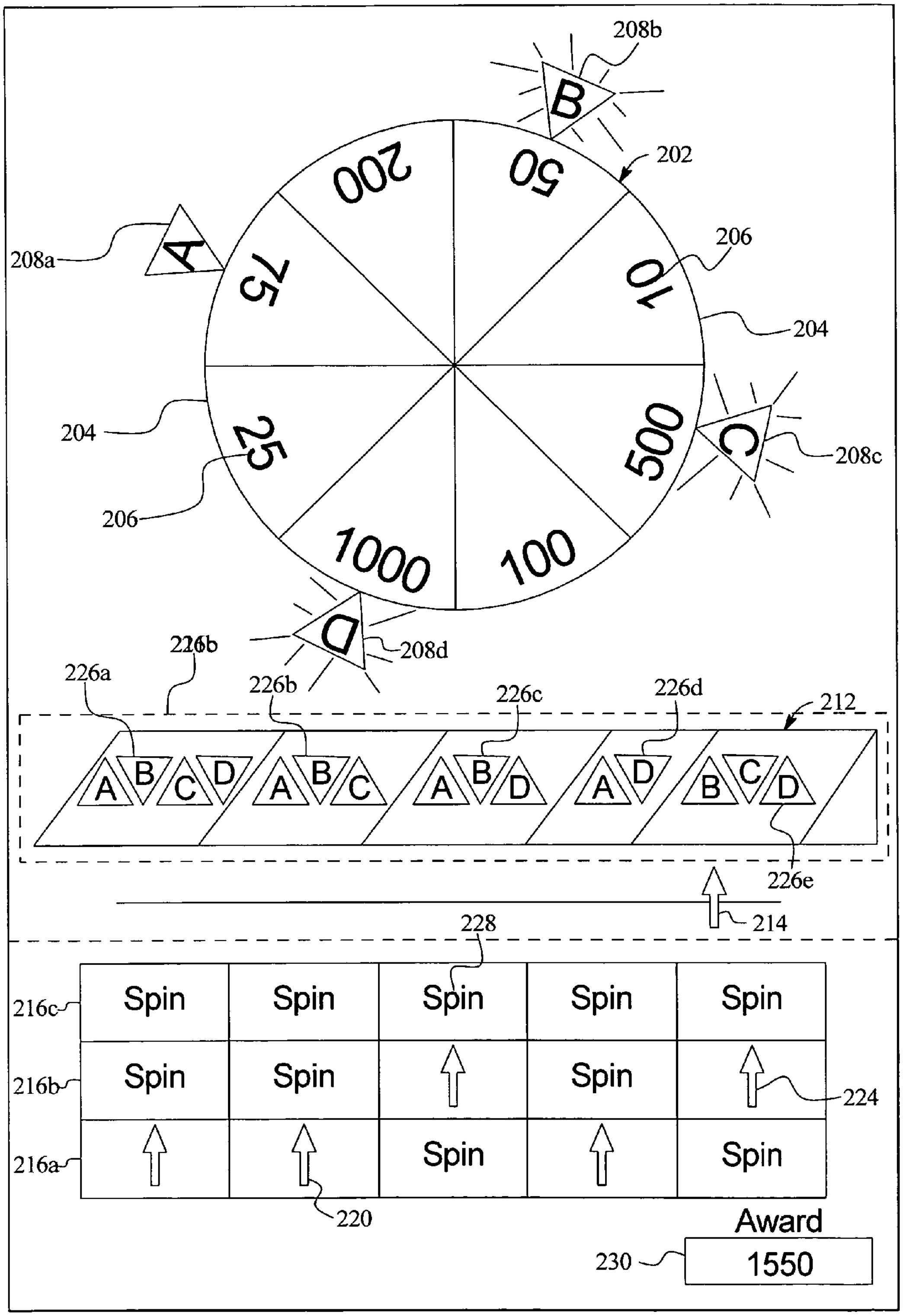

As illustrated in FIG. 10H, in one embodiment, after providing the player any award indicated by the activated selection indicators, the gaming device displays to the player the advance indicators or initiators associated with each of the plurality of selections. It should be appreciated that this embodiment provides increased excitement for the player because the player is enabled to view how a different outcome of the game may have been determined if they had picked different selections during game play.

As illustrated in FIG. 10H and as described above, for each subsequent selection group, the gaming device associated a greater number of initiators with the selections in that selection group and thus each advance to a subsequent selection group provides an increased probability that the player will pick an initiator. In this example, since each subsequent selection group is associated with an activator symbol set of a higher average total award or payout than the previous activator symbol set associated with the previous selection group, each player picked advance indicator increases the average total award or payout which may be provided to the player. Accordingly, in one embodiment, the present invention provides a multi-level selection game wherein each level is associated with a higher average total award or payout and the player is enabled to select which average total award level any award(s) provided to the player are selected from.

Figure 11:
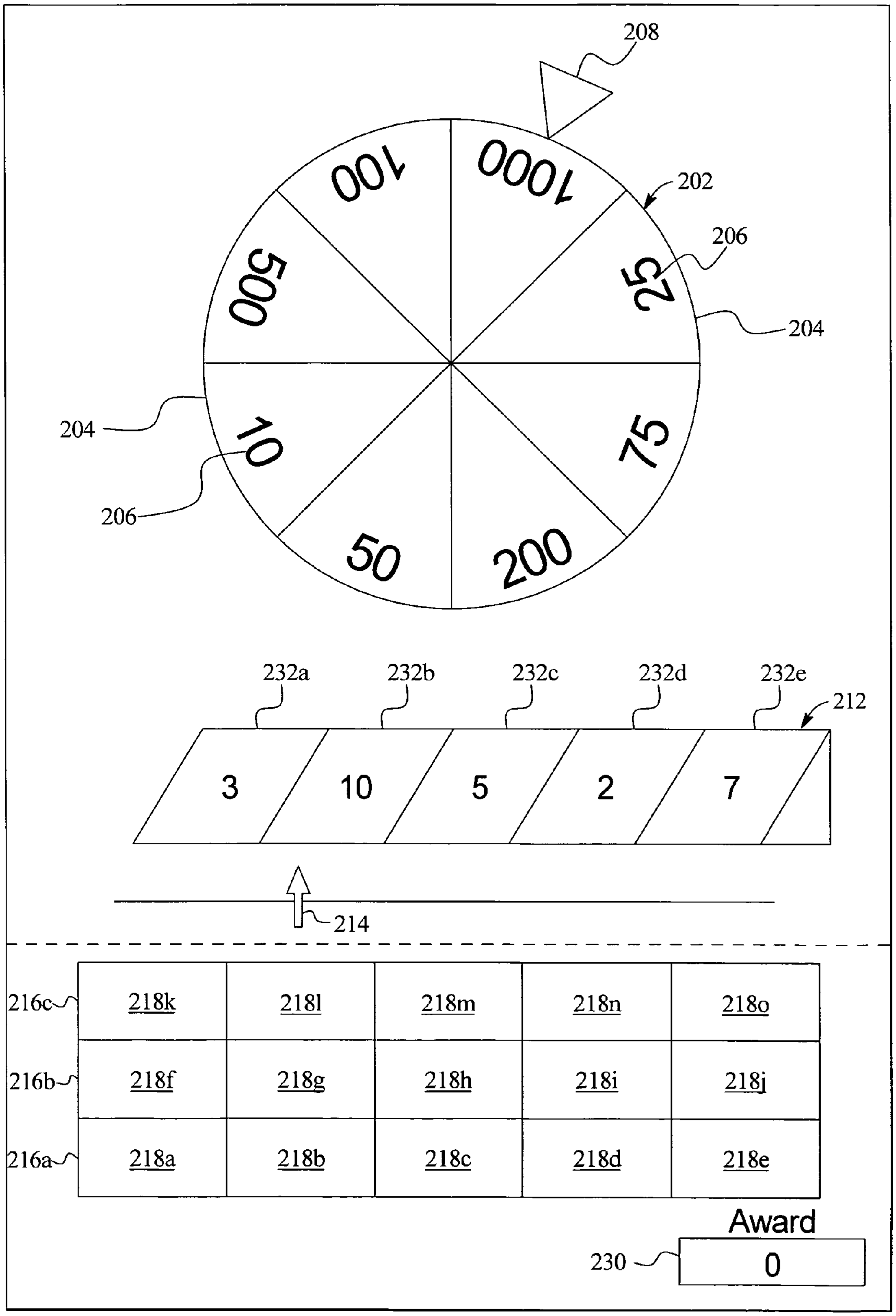
FIG. 11 is a front elevational view of an alternative embodiment of the gaming device of the present invention, wherein each of the plurality of activator symbols is associated with a different number of activations of the award generator.

As illustrated in FIG. 11, in an alternative embodiment, each of the activator symbols is associated with a number of activations of the award generator. In this embodiment, activator symbol 230*a* is associated with three activations of the award generator, activator symbol 230*b* is associated with ten activations of the award generator, activator symbol 230*c* is associated with five activations of the award generator, activator symbol 230*d* is associated with two activations of the award generator and activator symbol 230*e* is associated with seven activations of the award generator. This embodiment proceeds as described above with regard to FIGS. 10A to 10H, however, the indicated activator symbol corresponds to the number of activations of the award generator. It should be appreciated that in other embodiments, the activator symbols may correspond to a number of plays of a game, a number of modifiers provided to a player or any other suitable aspect of game play.

It should be appreciated that, as described above, one or more of the different sets or levels of activator symbols correspond, on average, with a different average award or payout provided to the player than another set of activator symbols. For example, if the activator symbols in a first level of activator symbols average five activations of the award generator and the activator symbols in a second level of activator symbols average ten activations of the award generator, then the second level of activator symbols is associated with a higher average award or payout than the first level of activator symbols. That is, as the number of activations of the award generator relates to the number of awards provided to the player (i.e., each activation provides the player at least one award) and the greater the number of awards provided to the player, the greater the average total award or total payout, in this example, the second level of activator symbols will provide the player more awards and thus a greater average total award or total payout than the first level of activator symbols.

In another embodiment, different sets of activator symbols may each correspond to a different function of the award generator. For example, the activator symbols in a first set of activator symbols may relate to the number of section indicators which will be active for one or more activations of the award generator while the activator symbols in a second set of activator symbols may relate to the number of activations of the award generator. In another embodiment, a plurality of activator symbols within each activator symbol set may each correspond to a different function of the award generator. For example, one activator symbol may relate to the number of section indicators which will be active for one or more activations of the award generator while another activator symbol in the same set of activator symbols may relate to the number of activations of the award generator. In an alternative embodiment (not shown), each of the awards adapted to be generated by the award generator is associated with a characteristic, such as a color. In one embodiment, at least one characteristic is associated with a plurality of awards. In another embodiment, a plurality of characteristics are each associated with a plurality of awards. In this embodiment, the final selection group includes at least one advance indicator. If the player advances to the final selection group and picks the selection associated with an advance indicator, in one embodiment, the gaming device bypasses the selection of an activator symbol and proceeds to activate the award generator. The activated award generator generates or indicates one award and the gaming device provides the player the generated award as well as every other award associated with the same characteristic as the generated award. For example, if the player picks an advance indicator in the final selection group, the gaming device activates the award generator to generate an award which is associated with the color red. The gaming device subsequently provides the player each of the awards associated with the color red and ends the game.

In another embodiment, if the player picks an advance indicator in the final selection group, the gaming device proceeds with selecting one of the activator symbols as described above. In one embodiment wherein the selected activator symbol corresponds to the number of section indicators active for one or more activations of the award generator, the gaming device provides the player each award associated with the same characteristic as one or more of the awards indicated by one or more of the active section indicators. In another embodiment wherein the selected activator symbol corresponds to the number of activations of the award generator, for one or more of the activations of the award generator, the gaming device provides the player each award associated with the same characteristic as at least one of the awards generated during at least one of the award generations.

While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited only by the scope of the claims.

The invention is claimed as follows:

1. A gaming device operable under control of a processor, said gaming device comprising:

a game controlled by the processor;

a plurality of awards in said game;

an award generator in said game, said award generator operable to generate said plurality of awards;

a plurality of award indicators in said game, said plurality of award indicators associated with said award generator;

a plurality of activator symbol sets, each symbol set including a plurality of activator symbols and at least two of said activator symbols in at least one symbol set are different, wherein each activator symbol is associated with at least one of said award indicators and at least one activator symbol in at least one of the symbol sets is associated with at least two award indicators; and a plurality of selections sets in said game, each selection set associated with one of said plurality of activator symbol sets and each selection set including a plurality of selections, wherein for at least one selection set, at least one selection is associated with an advance indicator and at least one selection is associated with an initiator; and a display device adapted to display at least part of said game;

wherein said processor is operable with said display device to control a play of said game by:

(a) displaying one of the selection sets;

(b) determining the activator symbol set associated with said displayed selection set;

(c) causing one of the selections in said displayed selection set to be picked;

(d) revealing if the picked selection is associated with one of said advance indicators or one of said initiators;

(e) if the picked selection is associated with one of said advance indicators:

(i) displaying another one of said selection sets, (ii) determining said activator symbol set associated with said other displayed selection set, and (iii) repeating (b) to (d) at least once; and (f) if the picked selection is associated with one of said initiators:

(i) displaying said determined activator symbol set, (ii) indicating one of said activator symbols in said displayed activator symbol set, (iii) activating any of said award indicators associated with said indicated activator symbol, (iv) causing said award generator to generate at least one of said awards, and (v) providing a player any generated award indicated by each activated award indicator.

2. The gaming device of claim 1, wherein at least one of said activator symbols in each of a plurality of said symbol sets is associated with a plurality of said award indicators.

3. The gaming device of claim 1, wherein a plurality of said activator symbols in at least one of the symbol sets are each associated with a plurality of said award indicators.

4. The gaming device of claim 1, wherein each of said activator symbols in at least one of the symbol sets is associated with a plurality of said award indicators.

5. The gaming device of claim 1, wherein at least one of said activator symbols is associated with each of said award indicators.

6. The gaming device of claim 1, wherein each selection set is associated with a different activator symbol set.

7. The gaming device of claim 1, wherein a plurality of selection sets are each associated with the same activator symbol set.

8. The gaming device of claim 1, wherein for a plurality of said selection sets, at least one selection is associated with an advance indicator and at least one selection is associated with an initiator.

9. The gaming device of claim 1, wherein for each of said selection sets, at least one selection is associated with an advance indicator and at least one selection is associated with an initiator.

10. The gaming device of claim 1, wherein for at least one selection set, each of the selections are associated with initiators.

11. The gaming device of claim 1, wherein for at least one selection set, each of the selections are associated with advance indicators.

12. The gaming device of claim 1, wherein said processor is operable to control the play of the game by displaying the determined activator symbol set associated with the displayed selection set.

13. The gaming device of claim 1, wherein the award generator includes a wheel.

14. The gaming device of claim 1, which includes an activator symbol indicating device operable with said processor to indicate one of said activator symbols in one of said activator symbol sets.

15. The gaming device of claim 1, wherein if (b) and (d) are repeated a designated number of times, the processor is operable to control the play of the game by providing the player an award and terminating said game.

16. The gaming device of claim 15, wherein each of the awards is associated with a characteristic and the processor is operable to control the play of the game by causing said award generator to generate at least one of said awards and by providing the player the generated award and any non-generated award associated with the same characteristic as the generated award.

17. A gaming device operable under control of a processor, said gaming device comprising:

a game controlled by the processor;

a plurality of awards in said game;

an award generator in said game, said award generator operable to generate said plurality of awards;

a plurality of award indicators in said game, said plurality of award indicators associated with said award generator;

a plurality of activator symbol sets, each symbol set including a plurality of activator symbols and at least two of activator symbols in at least one symbol are different, wherein each activator symbol is associated with at least one activation of said award generator and at least one activator symbol in at least one of the symbol sets is associated with a plurality of activations of said award generator;

a plurality of selections sets in said game, each selection set associated with one of said plurality of activator symbol sets and each selection set including a plurality of selections, wherein for at least one of the selection sets, at least one selection is associated with an advance indicator and at least one selection is associated with an initiator; and a display device adapted to display at least part of said game;

wherein said processor is operable to control a play of said game by:

(a) displaying one of the selection sets;

(b) determining said activator symbol set associated with said displayed selection set;

(c) causing one of the selections in said displayed selection set to be picked;

(d) revealing if the picked selection is associated with one of said advance indicators or one of said initiators;

(e) if the picked selection is associated with one of said advance indicators:

(i) displaying another one of said selection sets and said activator symbol set associated with said other displayed selection set, and (ii) repeating (b) to (d) at least once; and (f) if the picked selection is associated with one of said initiators:

(i) displaying said determined activator symbol set, (ii) indicating one of said activator symbols in said displayed activator symbol set, (iii) determining a number of activations of said award generator, wherein said number of activations is based on said indicated activator symbol, (iv) causing said award generator to generate at least one of said awards, (v) providing a player each award generated by said award generator, and (vi) repeating (iii) to (v) until no activations of said award generator remain.

18. The gaming device of claim 17, wherein at least one of said activator symbols in a plurality of symbol sets is associated with a plurality of activations of said award generator.

19. The gaming device of claim 17, wherein a plurality of said activator symbols in at least one symbol set are each associated with a plurality of activations of said award generator.

20. The gaming device of claim 17, wherein each of said activator symbols in at least one symbol set is associated with a plurality of activations of said award generator.

21. The gaming device of claim 17, wherein each selection set is associated with a different activator symbol set.

22. The gaming device of claim 17, wherein a plurality of selection sets are each associated with the same activator symbol set.

23. The gaming device of claim 17, wherein for a plurality of said selection sets, at least one selection is associated with an advance indicator and at least one selection is associated with an initiator.

24. The gaming device of claim 17, wherein for each of said selection sets, at least one selection is associated with an advance indicator and at least one selection is associated with an initiator.

25. The gaming device of claim 17, wherein for at least one selection set, each of the selections are associated with initiators.

26. The gaming device of claim 17, wherein for at least one selection set, each of the selections are associated with advance indicators.

27. The gaming device of claim 17, wherein said processor is operable to control the play of the game by displaying the determined activator symbol set associated with the displayed selection set.

28. The gaming device of claim 17, wherein the award generator includes a wheel.

29. The gaming device of claim 17, which includes an activator symbol indicating device operable with said processor to indicate one of said activator symbols in one of said activator symbol sets.

30. The gaming device of claim 17, wherein if (b) and (d) are repeated a designated number of times, the processor is operable to control the play of the game by providing the player an award and terminating said game.

31. The gaming device of claim 30, wherein each of the awards is associated with a characteristic and the processor is operable to control the play of the game by causing said award generator to generate at least one of said awards and by providing the player the generated award and any non-generated award associated with the same characteristic as the generated award.

32. A method of operating a gaming device, said method comprising:

(a) displaying one of a plurality of selection sets, each selection set including a plurality of selections, wherein for at least one selection set, at least one selection is associated with an advance indicator and at least one selection is associated with an initiator and each selection set is associated with one of a plurality of activator symbol sets, (b) determining said activator symbol set associated with said displayed selection set, each symbol set including a plurality of activator symbols and at least two of said activator symbols in at least one symbol set are different, wherein each activator symbol is associated with at least one of a plurality of award indicators and at least one activator symbol in at least one of the symbol sets is associated with at least two award indicators;

(c) causing one of the selections in said displayed selection set to be picked;

(d) revealing if the picked selection is associated with one of said advance indicators or one of said initiators;

(e) if the picked selection is associated with one of said advance indicators:

(i) displaying another one of said selection sets, (ii) determining said activator symbol set associated with said other displayed selection set, and (iii) repeating (b) to (d) at least once; and (f) if the picked selection is associated with one of said initiators:

(i) displaying said determined activator symbol set, (ii) indicating one of said activator symbols in said displayed activator symbol set, (iii) activating any of said award indicators associated with said indicated activator symbol, (iv) generating at least award, and (v) providing a player any generated award indicated by each activated award indicator.

33. The method of claim 32, wherein at least one of said activator symbols in a plurality of said symbol sets is associated with a plurality of said award indicators.

34. The method of claim 32, wherein a plurality of said activator symbols in at least one of the symbol sets are each associated with a plurality of said award indicators.

35. The method of claim 32, wherein each of said activator symbols in at least one of the symbol sets is associated with a plurality of said award indicators.

36. The method of claim 32, wherein at least one of said activator symbols is associated with each of said award indicators.

37. The method of claim 32, wherein each selection set is associated with a different activator symbol set.

38. The method of claim 32, wherein a plurality of selection sets are each associated with the same activator symbol set.

39. The method of claim 32, wherein for a plurality of said selection sets, at least one selection is associated with an advance indicator and at least one selection is associated with an initiator.

40. The method of claim 32, wherein for each of said selection sets, at least one selection is associated with an advance indicator and at least one selection is associated with an initiator.

41. The method of claim 32, wherein for at least one selection set, each of the selections are associated with initiators.

42. The method of claim 32, wherein for at least one selection set, each of the selections are associated with advance indicators.

43. The method of claim 32, which includes displaying the determined activator symbol set associated with the displayed selection set.

44. The method of claim 32, which includes providing the player an award and performing a terminating event if (b) and (d) are repeated a designated number of times.

45. The method of claim 44, wherein each of the awards is associated with a characteristic and which includes providing the player the generated award and any non-generated award associated with the same characteristic as the generated award.

46. The method of claim 32, which is provided to the player through a data network.

47. The method of claim 46, wherein the data network is an internet.

48. A method of operating a gaming device, said method comprising:

(a) displaying one of a plurality of selection sets, each selection set including a plurality of selections, wherein for at least one selection set, at least one selection is associated with an advance indicator and at least one selection is associated with an initiator and each selection set is associated with one of a plurality of activator symbol sets, (b) determining said activator symbol set associated with said displayed selection set, each symbol set including a plurality of activator symbols and at least two of said activator symbols in at least one symbol set are different, wherein each activator symbol is associated with at least award generation and at least one activator symbol in at least one of the symbol sets is associated with a plurality of award generations;

(c) causing one of the selections in said displayed selection set to be picked;

(d) revealing if the picked selection is associated with one of said advance indicators or one of said initiators;

(e) if the picked selection is associated with one of said advance indicators:

(i) displaying another one of said selection sets, (ii) determining said activator symbol set associated with said other displayed selection set, and (iii) repeating (b) to (d) at least once; and (f) if the picked selection is associated with one of said initiators:

(i) displaying said determined activator symbol set, (ii) indicating one of said activator symbols in said displayed activator symbol set, (iii) determining a number of award generations, wherein said number of award generations is based on said indicated activator symbol, (iv) generating at least one award, (v) providing a player each generated award, and (vi) repeating (iii) to (v) until no award remains.

49. The method of claim 48, wherein at least one of said activator symbols in a plurality of symbol sets is associated with a plurality of award generations.

50. The method of claim 48, wherein a plurality of said activator symbols in at least one symbol set are each associated with a plurality of award generations.

51. The method of claim 48, wherein each of said activator symbols in at least one symbol set is associated with a plurality of award generations.

52. The method of claim 48, wherein each selection set is associated with a different activator symbol set.

53. The method of claim 48, wherein a plurality of selection sets are each associated with the same activator symbol set.

54. The method of claim 48, wherein for a plurality of said selection sets, at least one selection is associated with an advance indicator and at least one selection is associated with an initiator.

55. The method of claim 48, wherein for each of said selection sets, at least one selection is associated with an advance indicator and at least one selection is associated with an initiator.

56. The method of claim 48, wherein for at least one selection set, each of the selections are associated with initiators.

57. The method of claim 48, wherein for at least one selection set, each of the selections are associated with advance indicators.

58. The method of claim 48, which includes displaying the determined activator symbol set associated with the displayed selection set.

59. The method of claim 48, which includes providing the player an award and performing a terminating event if (b) and (d) are repeated a designated number of times.

60. The method of claim 59, wherein each of the awards is associated with a characteristic and which includes providing the player the generated award and any non-generated award associated with the same characteristic as the generated award.

61. The method of claim 48, which is provided to the player through a data network.

62. The method of claim 61, wherein the data network is an internet.

* * * * *